US009742135B2

(12) United States Patent
Gerdes et al.

(10) Patent No.: US 9,742,135 B2
(45) Date of Patent: Aug. 22, 2017

(54) SLIP RING TRANSDUCER

(71) Applicant: Wobben Properties GMBH, Aurich (DE)

(72) Inventors: Frank Gerdes, Grossefehn (DE); Aike Janssen, Emden (DE); Matthias Haller, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 37 days.

(21) Appl. No.: 14/441,437

(22) PCT Filed: Nov. 6, 2013

(86) PCT No.: PCT/EP2013/073190
§ 371 (c)(1),
(2) Date: May 7, 2015

(87) PCT Pub. No.: WO2014/072355
PCT Pub. Date: May 15, 2014

(65) Prior Publication Data
US 2016/0028199 A1 Jan. 28, 2016

(30) Foreign Application Priority Data

Nov. 7, 2012 (DE) ........................ 10 2012 220 293

(51) Int. Cl.
*H01R 39/00* (2006.01)
*H01R 39/08* (2006.01)
(Continued)

(52) U.S. Cl.
CPC ............... *H01R 39/08* (2013.01); *F03D 9/25* (2016.05); *F03D 80/82* (2016.05); *H01R 39/00* (2013.01);
(Continued)

(58) Field of Classification Search
None
See application file for complete search history.

(56) References Cited

U.S. PATENT DOCUMENTS 2,436,949 A 3/1948 Anderson
2,696,570 A * 12/1954 Pandapas ............... H01R 39/00
200/237

(Continued)

FOREIGN PATENT DOCUMENTS

CN 201570950 U 9/2010
DE 20 58 343 A1 6/1971
(Continued)

*Primary Examiner* — Tho D Ta
(74) *Attorney, Agent, or Firm* — Seed Intellectual Property Law Group LLP

(57) ABSTRACT

The invention relates to a slip ring assembly of a slip ring transducer for transducing electrical signals between a stationary part and a part which rotates around an axis of rotation, comprising: at least one slip ring for transducing one of the electrical signals between the slip ring and at least one slip element trailing thereon, in particular a brush, and a slip ring shaft for securing the at least one slip ring thereon, the slip ring shaft having guiding channels distributed along its circumference in order to receive electrical lines for electrically connecting the at least one slip ring.

20 Claims, 16 Drawing Sheets

(51) Int. Cl.
    *F03D 80/80*     (2016.01)
    *F03D 9/25*     (2016.01)
    *H01R 43/10*     (2006.01)

(52) U.S. Cl.
    CPC .............. *H01R 43/10* (2013.01); *Y02E 10/72* (2013.01); *Y10T 29/49011* (2015.01)

(56) References Cited

U.S. PATENT DOCUMENTS

| | | | |
|---|---|---|---|
| 3,042,998 A | 7/1962 | Sweett et al. | |
| 3,123,662 A * | 3/1964 | Fink | H02G 3/065 16/2.5 |
| 3,398,387 A * | 8/1968 | Wendell | G01C 19/10 29/597 |
| 3,686,514 A | 8/1972 | Dube et al. | |
| 4,837,920 A | 6/1989 | Sweet et al. | |
| 4,871,935 A | 10/1989 | Sweet et al. | |
| 4,964,815 A * | 10/1990 | Kawai | H01R 13/512 439/607.25 |
| 5,292,264 A * | 3/1994 | Blank | H01R 4/64 439/809 |
| 5,442,133 A * | 8/1995 | Arnold | B23K 35/0288 174/51 |
| 6,017,234 A * | 1/2000 | Walkup | H01R 13/193 439/266 |
| 6,077,096 A * | 6/2000 | Moring | H01R 4/64 439/801 |
| 6,469,909 B2 * | 10/2002 | Simmons | B81B 7/007 257/48 |
| 6,979,779 B2 * | 12/2005 | Grady | H02G 3/126 174/50 |
| 7,241,151 B1 * | 7/2007 | Bradshaw | H01R 11/287 411/181 |
| 8,106,562 B2 | 1/2012 | Krogh et al. | |
| 9,021,684 B2 * | 5/2015 | Lenker | H01R 43/10 29/596 |
| 9,039,423 B2 * | 5/2015 | Shinder-Lerner | H01R 39/64 310/232 |
| 2007/0274838 A1 | 11/2007 | Bagepalli et al. | |
| 2010/0164228 A1 | 7/2010 | Matsuo et al. | |
| 2012/0116723 A1 | 5/2012 | Shaw et al. | |
| 2014/0017940 A1 * | 1/2014 | Chen | H01R 13/6477 439/607.02 |

FOREIGN PATENT DOCUMENTS

| | | |
|---|---|---|
| DE | 2510578 A1 | 9/1975 |
| DE | 298 00 281 U1 | 6/1999 |
| DE | 201 16 756 U1 | 2/2002 |
| DE | 101 06 119 A1 | 9/2002 |
| EP | 2 019 460 A2 | 1/2009 |
| JP | 5913073 U | 1/1984 |
| JP | 6044380 U | 3/1985 |
| JP | 0222831 U | 2/1990 |
| JP | 4308677 A | 10/1992 |
| JP | 6-132058 A | 5/1994 |
| JP | 2012104109 A | 5/2012 |
| RU | 2078990 C1 | 5/1997 |
| RU | 2406872 C1 | 12/2010 |
| RU | 2458246 C1 | 8/2012 |
| TW | M377774 U1 | 4/2010 |
| WO | 96/14678 A1 | 5/1996 |
| WO | 2008/042183 A2 | 4/2008 |

* cited by examiner

SLIP RING TRANSDUCER

BACKGROUND

Technical Field

This invention relates to a slip ring transducer and its components, including a slip ring assembly, a slip ring shaft, an insulating body and a slip ring. This invention also relates to a wind turbine equipped with a slip ring transducer.

Description of the Related Art

Wind turbine slip ring transducers are generally known. They normally transmit electrical signals from the nacelle of a wind turbine to the aerodynamic rotor of the wind turbine, which, during operation, rotates relative to the nacelle or to the remainder of the nacelle. This involves the transmission of both large quantities of power required, e.g., for actuators or heating and data such as control signals or test signals. This type of wind turbine is illustrated in FIG. 1.

Standard slip ring transducers are constructed so that every signal being transmitted, i.e., data or power signals, uses appropriate cabling. Cables are therefore electrically connected to at least one electrically conductive slip ring, in order to transmit the relevant electrical signal to a brush rubbing on the corresponding slip ring. Brushes therefore form part of the slip ring transducer, which rotates, possibly in an opposite direction, relative to another section of the slip ring transducer supporting the slip ring.

A variety of techniques are known for slip rings and corresponding brushes, such as the use of a carbon brush where a type of carbon block rubs on the slip ring. Another variation involves a gold wire technique, which uses gold-coated cable ends that rub a slip ring. Likewise, a technique called multi-brush is known, which is also called a "multi-wire rubber", where the brushes rubbing the slip ring have multiple fine wires which lie and rub slightly sideways on the slip ring.

Said cables, which are connected to the slip rings, are fed into a hollow shaft on which the slip rings sit. Each cable is connected to its respective slip ring from the interior of this hollow shaft outwards. For this purpose, they are fed through the jacket of the hollow shaft in an insulated manner and make contact with the slip ring. Slip rings are also electrically insulated from one another and therefore are also electrically insulated from the hollow shaft. Care is taken that every slip ring sits firmly on the hollow shaft and rotates with it.

The size, i.e., specifically the axial dimensions of each slip ring, depends on its purpose, such as the type of signal and the amount of power it is designed to transmit. Accordingly, these slip rings, the supply lines and the electrical connection to each application must be adjusted individually. The same applies to the hollow shaft, which is designed to be long enough to hold all of the required slip rings.

The disadvantage of such known slip ring transducers therefore includes the fact that they must be redesigned for every new application. This leads to higher development expenditure with correspondingly higher costs, and also leads to additional expenditure for testing and field testing the slip ring transducers. Each element, which must be individually developed and manufactured, may introduce durability problems and every new development is untested at first regarding the durability of the new element.

The German Patent and Trademark Office has researched the following prior art in the priority application for this application: DE 201 16 756 U1, DE 29 800 281 U1, DE 20 58 343 A, U.S. Pat. No. 3,686,514 A, EP 2 019 460 A2, WO 96/14 678 A1, WO 2008/042 183 A2 and JP H06-132 058 A.

BRIEF SUMMARY

One or more embodiments of the present invention may address one or more of the above problems. One or more embodiments is directed to a slip ring transducer in particular, which allows slip ring transducers for different systems in particular, specifically for different wind turbines, to be created with the fewest possible individual elements or developmental steps. At least one alternative solution should be proposed.

According to one embodiment of the invention, a slip ring assembly that is designed as part of a slip ring transducer for transmitting electrical signals between a static part and a part rotating around a rotation axis. The slip ring assembly has at least one slip ring for transmitting one of the electrical signals between the slip ring and at least one rubbing slip element, in particular a so-called brush. Moreover, the slip ring assembly has a slip ring shaft to attach at least one slip ring to it.

To illustrate this more simply, the slip ring assembly, which includes the slip ring shaft and at least one slip ring, can be seen as the rotating part of the slip ring transducer. The rubbing slip element on at least one slip ring, specifically a so-called brush, is correspondingly attached to the static part of the slip ring transducer. In application, it is ultimately irrelevant whether in absolute terms the static part is stationary and the rotating part rotates, or vice versa, as long as the rotating part only rotates relative to the static part. Preferably, however, we intend that the slip ring assembly rotates in absolute terms, i.e., specifically in relation to a fixed object on the earth. In particular, for use in a horizontal axis wind turbine, the slip ring transducer and therefore the slip ring shaft have an essentially horizontal rotation axis, and correspondingly all of the elements of the slip ring assembly would have to be constructed for constant rotation. Centrifugal forces play almost no part in the case of slow rotation. However, this constant change of weight of the element resulting from rotation in an essentially horizontal rotational axis should be taken into consideration.

The proposed slip ring shaft has guide channels distributed around its circumference to take electrical cables, in order to electrically connect at least one of the slip rings. It is therefore now proposed that the electric cables intended to conduct electrical signals no longer (all) need to be bundled inside a slip ring shaft designed as a hollow shaft, but instead be laid further out in appropriate guide channels, preferably so that every guide channel can take one electrical cable for one electrical signal. This will allow the electric cables to be laid as required in the slip ring shaft, and therefore also be closer to the outer circumference of the slip ring shaft and therefore closer to each slip ring to which they are electrically connected. Laying out the guide channels around the circumference provides a significant additional space compared to laying out the electrical cables in the area of the rotational axis. The further the guide channels extend to the outer circumference of the slip ring shaft, the greater the additional space will be available for these.

The guide channels distributed around the circumference and therefore the correspondingly distributed electrical cables also mean improved heat distribution and therefore heat dissipation can be achieved.

Preferably, the slip ring shaft and/or at least one slip ring will be manufactured by extrusion or pultrusion. This allows long profiles with constant cross-sections in their axial direction to be manufactured, which then can be cut to the desired length. It is therefore simple to produce many different elements which have the same profile but are different in length. Many slip rings can be manufactured, which accordingly then only have to be cut to the desired length. It is also possible to produce a slip ring shaft with multiple guide channels in a comparably simple manner, if the correct equipment for producing many slip rings with identical diameters is used. In this case, the manufacture and preparation of a corresponding manufacturing device constitutes a large proportion of the expenditure and manufacturing costs, which are however spread out if many identical objects are being produced. Therefore, the comparably complex shape of a slip ring shaft can be manufactured with relatively low expenditure. The guide channels can be directly incorporated into this shaft using extroversion or pultrusion.

Pursuant to one embodiment, it is proposed that the slip ring shaft has radial supports stretching outwards, with grooves lying between each one, such that specifically 3, and preferably at least 6 braces are present, which specifically are identical and/or are uniformly distributed in a circumferential direction. Preferably, the shaft diameter cross-section, i.e., in a section across the rotation axis, will be roughly radial in shape.

This allows for a stable, specifically also rigid and torsionally rigid shaft, with multiple cables, specifically power transmission cables. To transmit electrical power in a three-phase system, three cables can correspondingly be fed into the shaft, where each individual cable is fed into a guide channel. If there are 6 braces and accordingly 6 grooves, there will be 6 guide channels to be able to guide the corresponding 6 cables, i.e., for example 2 bundles of 3 cables in a three-phase system.

A radial, specifically a symmetrical radial layout of these grooves and braces is particularly effective here. Using symmetry means that installation errors can be avoided. The radial shape is based on a cross section of the slip ring shaft, also more simply referred to as a shaft, as per a section across the rotational axis.

Pursuant to another embodiment, it is proposed that the slip ring shaft for channeling additional electrical cables has a through-hole with a longitudinal axis which matches the rotational axis. This type of through-hole can also be referred to as a central tube. It does not need to be produced by drilling. This allows the execution of a slip ring transducer in which such a central tube is intended for data cables which transfer data from rotating to static parts, and vice versa. The guide channels, which are specifically designed with corresponding grooves in the slip ring shaft, can hold electrical cables for power signals. These basic cable types are therefore separated from one another. Data cables laid in the central tube can pass completely through this slip ring shaft in a longitudinal direction, specifically to an information or data unit of the slip ring transducer, such that data is transmitted between static and rotating parts. The cabling laid in the guide channels, on the other hand, is not fed completely through the slip ring shaft in an axial direction, but is fed to a slip ring on the outside and is therefore electrically connected to it. This type of slip ring shaft is therefore also part of a power unit in the slip ring transducer, and is therefore a simple and expedient way of separating the power unit and the data unit. This separation involves both the layout of the respective slip rings and contacting brushes, and separate guidance of the corresponding cables in the slip ring shaft which form part of the power unit.

Another advantage of separating them in this way is the low electromagnetic influence on data cables from power cables.

Pursuant to at least one other embodiment, it is proposed for the slip ring assembly that at least one of the movable insulating bodies is used to electrically insulate two slip rings from one another, and/or to electrically insulate one slip ring from the slip ring shaft and/or to guide at least one electrical, or at least one of the electrical cables, into the guide channels in an insulated manner.

Therefore one, or preferably multiple, movable insulating bodies will be used. These can be moved onto the slip ring shaft and therefore allow modular construction. The insulating bodies, which have distributed guide channels around their circumference, are therefore adapted so that they can be moved. In order to insulate two slip rings from one another, the insulating bodies have, e.g., a corresponding circumferential section, which for example may be designed as a circumferential bridge or disk section arranged between two slip rings in an axial direction as intended. The two slip rings affected are therefore insulated from one another and can carry different electrical potentials.

In order to insulate the slip ring shaft from at least one slip ring, the insulating bodies are designed to be arranged in a radial direction between the slip ring shaft and at least one slip ring as intended. Specifically, the insulating bodies can be moved onto the shaft and above it, i.e., with a slightly larger diameter the slip rings can then be moved onto the insulating body.

An insulating body can therefore have the type of insulation section so as to insulate in a radial direction, i.e., between the shaft and slip ring, and it can also have the circumferential section described for insulating in an axial direction.

For example, different insulating bodies may be used, such as one with circumferential insulation ridges in an axial direction, and another without such insulation. By appropriately assembling this type of insulating body or other different insulating bodies, each specific configuration of the slip ring assembly, and therefore the resulting slip ring transducer, can be realized. To achieve this, the corresponding insulating body and the corresponding slip rings are simply successively pushed onto the slip ring shaft. This means that just by using different assemblies of insulating bodies and slip rings allows different slip ring assemblies and therefore different resulting slip ring transducers to be produced.

In order to insulate the electrical cables from the slip ring shaft, the insulating body is designed to have conduit sections, specifically hollow conduit sections, in the guide channels, which are specifically adapted to this. The corresponding cables can be laid in these conduit sections. Specifically, these insulating body cable conduit sections are adapted to the slip ring shaft guide channels in such a way that they can also take on a guidance role when inserting the insulating body into the slip ring shaft. The insulating bodies can also be fixed to the slip ring shaft in the direction of rotation.

Preferably, the slip ring shaft will have a profile and the insulating body will have a counter profile adapted to the slip ring shaft profile. This profile and the counter profile are specifically designed so that the insulating body and its counter profile, which is axial along the length of the slip ring shaft profile, can be moved onto the slip ring shaft. The profile and the counter profile therefore mesh together, creating a basically torque-proof connection. Depending on the fit, the insulating body can be moved easily with slight play or tightly, so that it is seated without play. Preferably, a tight fit can be made so that the profile and counter profile are not a tight fit across the entire profile, but only occasionally, for example using a corresponding raised bridge in the axial direction on the insulating body. These can easily be adapted if necessary, e.g., if they turn out to be too large, or if the insulating body gives slightly in the area of this bridge or other, counterbalancing ridges, in order to achieve a tight connection between the slip ring shaft and the insulating body.

Pursuant to one embodiment, it is proposed that multiple insulating bodies with identical cross sections but different lengths or different axial dimensions be used, and/or that multiple insulating bodies be used to precisely fit onto the slip ring shaft when put together. Slip rings for transmitting variable power, if they are used for the same slip ring assembly, significantly differ in their length or axial dimensions. Accordingly, an insulating body positioned between the slip ring shaft and the slip ring is adjusted to the appropriate length of the slip ring. By using multiple insulating bodies, specifically multiple insulating bodies of the same length, i.e., of the same axial dimensions, different lengths can be achieved by using multiple different insulating bodies moved behind one another on the slip ring shaft. This allows multiple slip rings to be assembled into one, but the problem with this for the slip rings is that they must be in contact with one another. In this regard, using different length single slip rings may be useful, and it is proposed, whereas the assembly of multiple corresponding insulating bodies is beneficial.

To make contact with a slip ring, an electrical cable is fed in one of the insulating channel sections of the insulating body, through an opening in the insulating body in its outer jacket to the slip ring and contacted there. In this way, the insulating body can have multiple cable duct sections such as three or six cable duct sections, depending on the number of guide channels in the slip ring shaft. Preferably however, an outer jacket of the insulating body only has one opening, or the insulating body only has one opening to a cable duct section. If the insulating body—and also, accordingly, the slip ring shaft—are radially and uniformly constructed, identical insulating bodies with openings in their jackets at identical points can still be assembled on the slip ring shaft, so that their openings lead to different guide channels.

A shape where the insulating body has stepped edges for fixing to corresponding stepped edges of an adjacent insulating body is advantageous. Thus, an insulating body may overlap on one side with an adjacent insulating body which has an existing edge, while on its other side, in an axial direction, it can overlap with an adjacent insulating body. This specifically improves the insulation at these joints between two insulating bodies. Accidental electrically conductive connections between two adjacent insulating bodies can be prevented from occurring or being able to occur. This overlapping avoids any opening between two adjacent insulating bodies, even if these are not completely or precisely seated next to one another. Adjacent insulating bodies can also be seated at the described overlap points; in particular they can overlap one another fully as intended together at their protruding edges, to give a tightly fitting shape of each of these insulating bodies for tight movement on the slip ring shaft. Guiding each insulating body on the slip ring shaft, i.e., on the profile of the slip ring shaft, also guarantees guiding adjacent insulating bodies when they are being put together or assembled, even in relation to the stepped edges.

Preferably at least one of the insulating bodies will be used as a marginal insulating body for electrically insulating at least one of the slip rings in a radial and in an axial direction. In addition or alternatively, at least one of the insulating bodies will be used as a spacer insulating body for electrically insulating at least one of the slip rings in a radial direction only. Such a spacer insulating body is placed specifically in an axial direction between two marginal insulating bodies, if there are two marginal insulating bodies. In particular, a slip ring can be added between two marginal insulating bodies, which specifically insulates axially on both sides and radially to the slip ring shaft. Depending on the length, i.e., depending on the axial dimensions of the slip ring, one or more spacer insulating bodies can be used between the two marginal insulating bodies.

According to one embodiment, insulating bodies can also be used which insulate only in an axial direction. To completely insulate a slip ring in both axial and radial directions, such axial insulating bodies can, for example, be used in combination with a corresponding number of spacer insulating bodies.

In this way, slip rings of different axial dimensions can be beneficially insulated, but only a few different insulating bodies are required. This therefore provides a modular solution. Using multiple differing spacer rings offers scalability, whereby the length required for each insulating area can easily be adapted to the slip ring.

The described circumferential steps, or a circumferential step on an attachment edge of an insulating body for attaching to its adjacent insulating body, also avoids creepage paths for creeping currents and therefore provides good insulation. This happens even when attaching multiple insulating bodies together to insulate a relatively long slip ring.

On the jacket surfaces or respectively one jacket surface of each insulating body, small ridges, in particular in the shape of flat axially aligned bridges are used, which during intended use move a superimposed slip ring from inside, and therefore ensure a firm seat of the slip ring on the insulating body. A tight fit of the slip ring on the insulating body can therefore be achieved without having to provide a correspondingly tight fit between the insulating body and the slip ring.

According to yet another embodiment, it is proposed that multiple insulating bodies are assembled on the slip ring shaft, and together form at least one axial cable duct to guide one electrical cable for electrically connecting each slip ring, where at least one cable duct is electrically insulated by the insulating body from the other slip rings and/or from the slip ring shaft. Specifically, such a cable duct runs inside a guide channel of the slip ring shaft. Specifically, such a guide channel can be composed of the cable duct sections described above, where every insulating body has at least one hollow cable duct section, forming part of the insulating body profile and being partly formed in the guide channel. Preferably, such a cable duct section is composed of one section of the insulating body, which is adapted to one of the guide channels, and specifically forms a counter profile, and one section forming a segment of an outer jacket of the insulating body which supports the slip ring.

Preferably, at least one ridge will be used on an external cylinder section of at least one insulating body, in order to achieve a firm seat of one of the slip rings pushed up onto this cylinder section. Such ridges can be used simply and avoid any insulating bodies and slip rings seated on them being adapted to one another with accordingly greater precision.

Preferably, multiple identical interchangeable slip rings and/or multiple identical interchangeable insulating bodies will be used, specifically moved on the slip ring shaft. This allows modular construction. The proposed slip ring shaft offers a very good basis for this. Different insulating bodies can be moved in an axial direction on the slip ring shaft which, depending on the slip ring assemblies being manufactured and therefore the slip ring transducers being manufactured, may also be arranged differently in the axial sequence. Irrespective of this, however, axial cable ducts appear in the insulating bodies, and different slip rings can be configured, namely the types that are different regarding their axial dimensions. Different slip rings may be configured in the axial direction, and in comparison to another slip ring assembly made with this, slip rings from the same basic modules can be configured and contacted. The proposed solution or proposed solutions therefore allow modular construction. This can also offer an advantage over prior art slip ring transducers.

Such a modular construction method using different individual parts has advantages for assembly and for recycling. From known prior art solutions, using molded slip rings amongst other things, inseparable units cannot be reprocessed or can only be reprocessed at great expense.

Pursuant to one embodiment, a slip ring assembly is proposed, which is characterized by the fact that the slip ring is made from a bronze slide bearing semi-finished product, and is specifically pultruded or extruded. For example, a semi-finished product made of CuSn8 or CuSn6 can be used. It is therefore possible to cut this semi-finished product to the required length and to process it mechanically. Existing semi-finished product geometry can save processing time, and predefined fixed components can be made using pultrusion. One embodiment is proposed where a threaded weld stud is used to fix an electrical connection cable of at least one slip ring, which has at least one slip ring with a soldered or welded connector and/or the connector is extruded or pultruded onto the slip ring, and it has a press-fitted connector during extrusion or pultrusion.

This allows a secure contact between the slip ring and a corresponding electrical cable, specifically a corresponding electrical connection cable, to be created simply and expediently.

In particular, using a threaded weld stud allows a corresponding electrical cable that is due to be connected to be screwed onto this threaded weld stud in a simple way, if the electrical cable has a corresponding cable shoe with loops. The threaded weld stud as such can be easily welded using welding to the slip ring from inside. Producing such a slip ring assembly may, for example, mean that the electrical cable is screwed to the slip ring from inside, before the slip ring is moved onto the slip ring shaft and onto a corresponding insulating body. The slip ring assembly can be made such that an insulating body is moved onto the shaft, which has an opening in its jacket to feed through the corresponding electrical cable. This opening is preferably designed to be open in at least an axial direction, so that the corresponding slip ring equipped with the electrical cable can be moved onto this insulating body, and that therefore the attached electrical cable is moved axially into the insulating body opening, roughly in the area of its connection point. Then the next insulating body can be moved onto the shaft, whether this is to insulate this slip ring or a following slip ring, such that during the movement the electrical cable of this additional insulating body is fed through its cable duct section. This cable duct section in the new insulating body has no opening in its external jacket, but the corresponding cable section of the previously moved insulating body has an opening, i.e., the one through which the cable previously attached to the slip ring now extends.

This specific solution using modular construction offers a relatively simple and therefore stable connection option for the electrical cables concerned to the slip rings concerned.

Pursuant to another embodiment, it is proposed that for the slip ring assemblies in the axial direction, there be multiple slip ring sections, and that each slip ring section should form a galvanically connected unit, and that slip ring sections of different axial dimensions have many different slip rings of the same size, so that each axial dimension, i.e., the length, of each slip ring section can be reached by the number of slip rings used, and/or different multiple insulating bodies, specifically different multiple spacer insulating bodies of the same size are present. Therefore, correspondingly many and different insulating bodies and correspondingly many or different slip rings are moved onto the slip ring shaft in order to create a slip ring assembly for the desired application.

A slip ring transducer for transmitting electrical signals between a static part and a part rotating around a rotational axis is also proposed, whereby this slip ring transducer has a slip ring assembly as per at least one embodiment described above.

A slip ring transducer is preferably configured such that there is a signal unit section and a power unit section, and the signal segment and the power segment each have a fixed mounted section which can also be rotated, and that both mounted sections which can be rotated, i.e., the mounted section of the signal segment that can be rotated and the mounted section of the power unit that can be rotated, preferably be separable using a coupling element, but be connected in such a manner that a rotating movement of a mounted section that can be rotated can be transmitted via the coupling element onto the other mounted section that can be rotated. These two mounted segments which can be rotated are specifically designed as a signal unit shaft and a power unit shaft, and can be referred to as such. It is therefore proposed that the signal unit shaft is fixed to the power unit shaft in such a way that it can be detached. A tappet bushing is specifically proposed for this purpose that forms the coupling element on the power unit and is designed to take a corresponding drive pin on the signal unit, specifically on the signal unit shaft. In this way, the signal unit and the power unit can be connected or separated easily and functionally. For this purpose, the fixed section of the signal unit section can be attached to the fixed section of the power unit section so that the pin, or another similar element, of the signal unit shaft, or similar element is inserted into the power unit shaft. Fixing the two fixed parts of the power unit section and the signal unit section simultaneously effects a functional connection between the signal unit shaft and the power unit shaft. This specifically creates a functional connection such that both shafts rotate together via this mechanical coupling.

This therefore allows particularly advantageous, and basically separate manufacture of the power unit on the one hand and the signal unit on the other hand. It is also preferably proposed that the power unit shaft have a central axial longitudinal hole, known specifically as a central tube, through which the corresponding electrical cables can be fed to the signal unit, i.e., to the signal unit shaft. Preferably, in the transmission area between the power unit shaft and the signal unit shaft, there will be an electrical plug connection to connect the electrical cables fed through the central tube. Accordingly, it is proposed that one or more plugs on the power unit shaft and corresponding plugs on the signal unit shaft to electrically connect the electrical cables attached thereto.

Preferably, the power unit section, which can be more simply referred to as the power unit, will have closed housing using quick release fasteners. The slip ring transducer, particularly the housing of the power unit, is therefore easy and quick to access. This would allow faults to be found, and the modular construction of the slip ring transducer would accordingly allow repairs to be carried out with relatively little effort. In any case, the described embodiments above make it easier to replace individual elements, without the entire slip ring transducer needing to be dismantled or completely replaced by a new unit or needing to be repaired in a workshop in the event of a fault.

Preferably, at least one of the sections mounted so that it can rotate, i.e., at least one of the power unit shafts or signal unit shafts, can be mounted using at least one pre-stressed bearing. This bearing tension provides a minimum load and therefore the correct rolling ratio for the rolling element. In addition, the bearing will be as free from play as possible, so that there is as little undesired movement of the signal shaft as possible, e.g., lurching.

Likewise, a slip ring shaft of a slip ring assembly is proposed. Such a slip ring shaft has at least one of the characteristics described above in connection with the explanation of embodiments of the slip ring assembly or the slip ring transducer. Specifically, the slip ring shaft has guide channels distributed around its circumference to take electrical cables in order to electrically connect at least one slip ring. Such a slip ring shaft therefore allows the advantages described above in relation to this to be achieved.

Likewise, an insulating body of a slip ring assembly is proposed, which is designed to move up onto the slip ring shaft of a slip ring assembly, according to at least one of the embodiments described above. The insulating body correspondingly has at least one characteristic describing the insulating body in connection with at least one embodiment of the slip ring assembly, the slip ring transducer and/or the slip ring shaft.

In any case, a slip ring of a slip ring assembly is proposed pursuant to at least one of the described embodiments. Preferably, the slip ring for moving on an insulating body will be made according to one of the described embodiments for an insulating body. Preferably, all slip rings and insulating bodies will be braced against one another by an end element, which can also be referred to as an end cover, so that the slip rings can no longer rotate relative to the insulating bodies. Such an end cover is preferably also a bearing position of a movable bearing.

The slip ring preferably has at least one characteristic described in connection with at least one embodiment of the slip ring transducer or one of its elements.

Likewise, a wind turbine with a nacelle and a mounted aerodynamic motor is proposed, which can rotate relative to the nacelle, which has at least one slip ring transducer pursuant to one of the embodiments described for it. Such a slip ring transducer used in a wind turbine is specifically intended to transmit electrical energy to rotor blade actuators in the rotor and to transmit electrical signals to control such a motor in order to adjust the rotor blades, or to transmit data for system communication and, specifically system bus communication, and/or to transmit test data from the rotor to the nacelle. Additionally or alternatively, the slip ring transducer is set up to transmit electric power to a rotor of an electric generator. In particular, it is set up to transmit a DC current for exciting a rotor of a synchronous generator. In particular, it is used in combination with a direct drive wind turbine, wherein a rotor of the wind turbine generator rotates with the aerodynamic rotor of the wind turbine.

BRIEF DESCRIPTION OF THE SEVERAL VIEWS OF THE DRAWINGS

The invention is now described in more detail below using embodiments as examples with reference to the accompanying figures.

DETAILED DESCRIPTION

Below, similar but not identical elements with identical reference numbers are shown, to underline their functional similarity. Identical embodiments or elements of identical embodiments may be illustrated on different scales.

Figure 1:
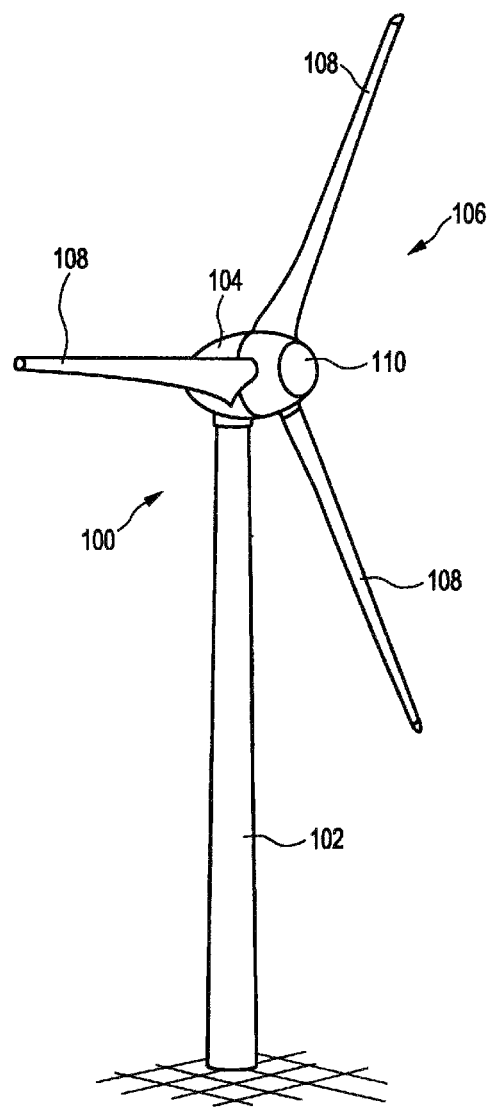
FIG. 1 shows a schematic view of a perspective illustration of a wind power installation.

FIG. 1 shows a wind turbine 100 with a tower 102 and nacelle 104. A rotor 106 with three rotor blades 108 and a spinner 110 is located on the nacelle 104. The rotor 106 is set in operation by the wind in a rotating movement and thereby drives a generator in the nacelle 104.

Figure 2:
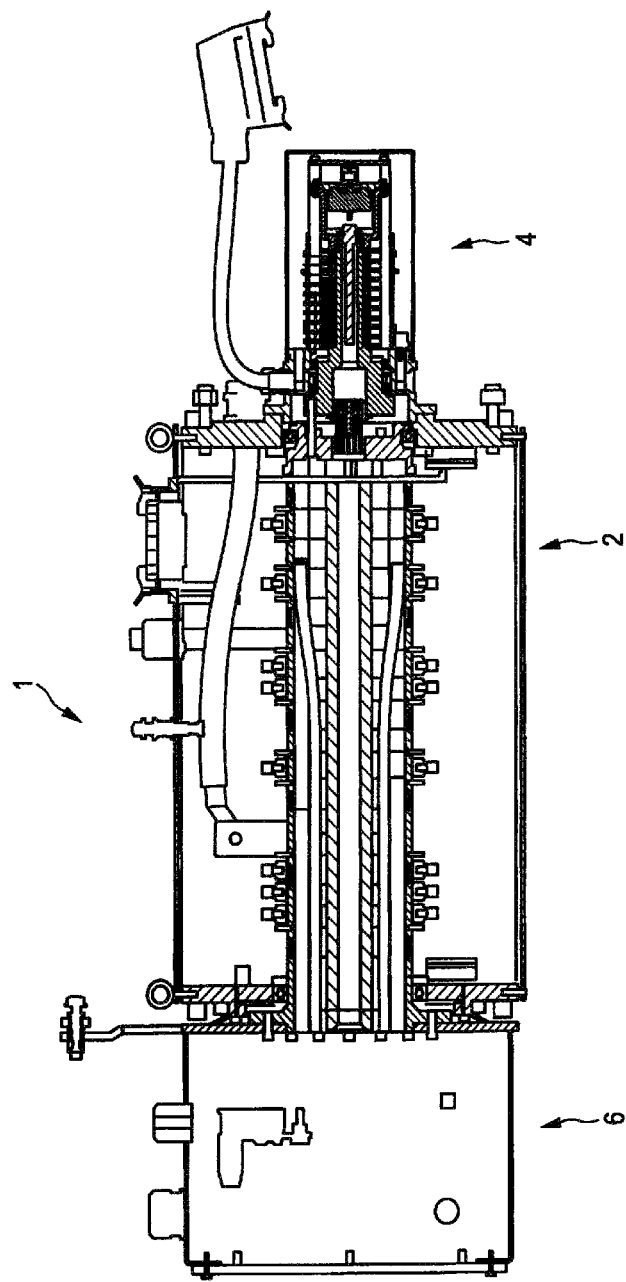
FIG. 2 shows a side sectional view of a slip ring transducer.

FIG. 2 shows a side section view of a slip ring transducer 1 with a power unit 2, a signal unit 4 and a rotating connector 6. Details of the power unit 2 with the rotating connector 6 are shown in FIG. 3 and details of the signal unit 4 are shown in FIG. 4.

Figure 3:
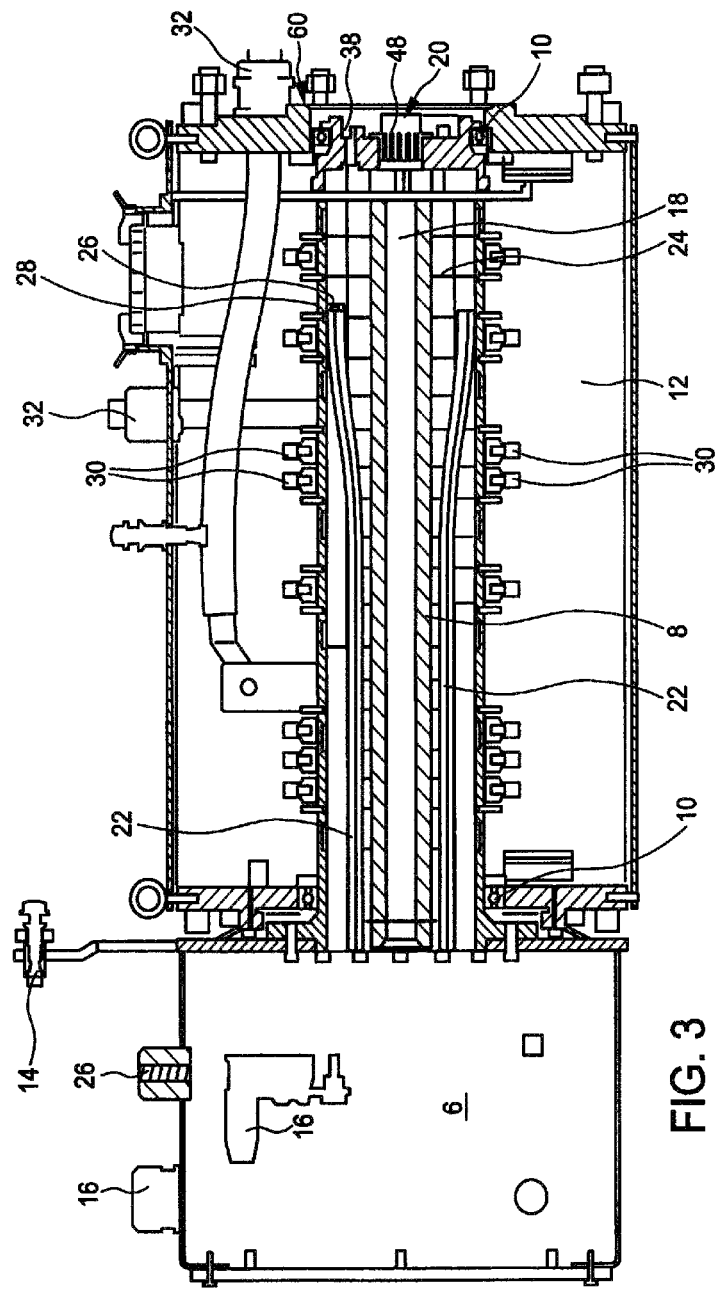
FIG. 3 shows part of a slip ring transducer from FIG. 2 in a side sectional view, where a signal unit is dismantled.
Figure 4:
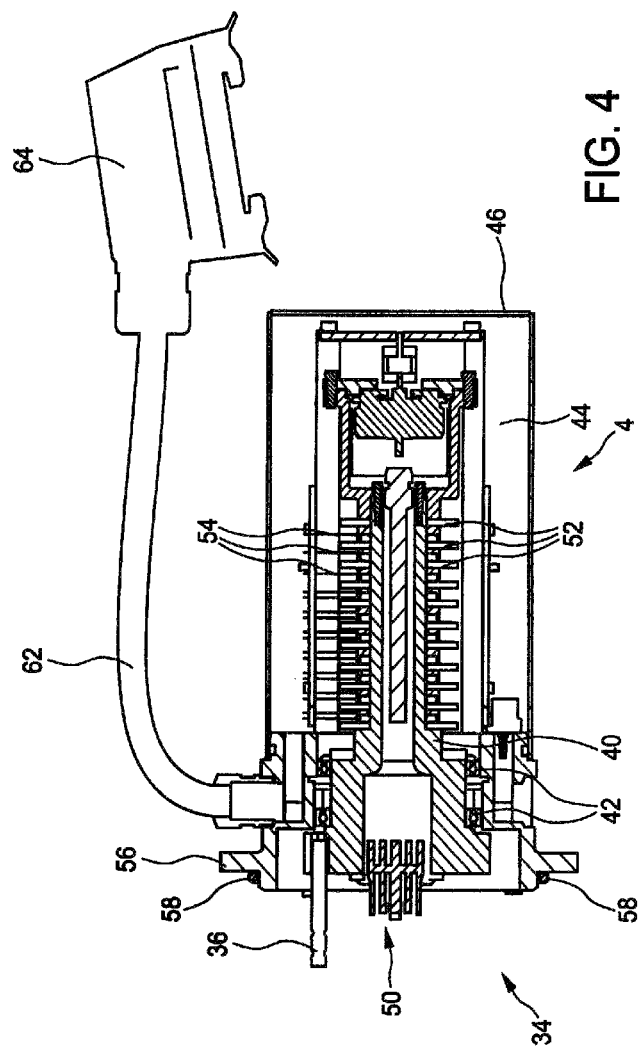
FIG. 4 shows another part of the slip ring transducer from FIG. 2, i.e., a dismantled signal unit, which is correspondingly not shown in FIG. 3.

FIG. 3 shows the rotating connector 6 firmly attached to a slip ring shaft 8. The slip ring shaft 8 is mounted rotationally using two power unit bearings 10 relative to the static power unit 12. This means that the rotating connector 6 is also mounted rotationally relative to the static power unit 12.

The rotating connector 6 can be attached via a driver attachment 14 to a rotating component, e.g., part of an aerodynamic rotor in a wind turbine, such that the rotating connector 6 rotates with this rotor cited as an example, whereby the slip ring shaft 8 rotates with it simultaneously. All connections in this rotating element, which in this example is given as a wind turbine aerodynamic rotor, may be connected to various connector elements 16, which can be arranged entirely differently on the rotating connector 6. This concerns both power connections and signal connections. For clarity, it should be noted that the slip ring transducer 1 can in principle be used to transmit electrical signals, both high-powered electrical signals, specifically supply currents for corresponding electrical devices, and also contains electrical signals which essentially transmit information like control signals or test signals. However, where the power unit 2 and the signal unit 4 and their components differ in the slip ring transducer 1 is in the signal unit 4, the part of the slip ring transducer 1 that basically transmits low power signals, i.e., particularly control and test signals. In contrast to this, the power unit is the part of the slip ring transducer which transmits high power density or high power, i.e., power which is significantly higher than that from the signal unit. Preferably, a ground connection being made via the slip ring transducer—in electro-technical terms—will also be made via the power unit.

Details of the connection between the electrical cables and the rotating connector are irrelevant. In any case, electrical cables lead from the rotating connector 6 to the slip ring shaft 8. Electrical cables intended to transmit low-power signals and which should lead to the signal unit are guided in an axial through-hole, called a central tube 18, to the signal unit connection area 20.

Electrical cables for transmitting high power, which for the sake of simplicity can be referred to as energy cables 22 or power cables 22, are guided into the slip ring shaft 8 outside the central tube 18 in guide channels 24. The power cables 22 are thus attached to a slip ring 28 via a threaded weld stud 26. The threaded weld stud 26 is welded to the slip ring 28 for this reason, and the power cable 22 is firmly screwed onto the threaded weld stud using a cable shoe, which cannot be seen in FIG. 3 but is illustrated later, and is therefore galvanically connected to the relevant slip ring 28.

The static power unit 12 has brushes 30, which may have different axial lengths, and which rub the slip ring 28 in order to transmit an electric current from the slip ring shaft 8 to the static power unit 12. The electrical energy transmitted between the slip rings 28 and brushes 30 can then be further transmitted from the static power unit via appropriate static connector elements 32 and passed on. The specific embodiment of static connector elements 32 is irrelevant. Incidentally, the transmission direction of the electrical cables, i.e., via electrical current from the rotating parts to the static part, is only cited as an example. Likewise, transmission in the opposite direction is considered as is usual, for example, during the transmission of electrical energy from a wind turbine nacelle to a wind turbine aerodynamic rotor via this type of slip ring transducer 1.

The signal unit 4 shown in FIG. 4 has a signal connection area 34 that corresponds to the signal connection area 20 of the power unit 2. To produce a fully constructed slip ring transducer 1 as shown in FIG. 2, the signal unit 4 must be positioned and firmly screwed onto the front of the power unit 2 in the signal connection area 20 with its corresponding signal connection area 34. To do this, a drive pin 36 in the signal unit 4 meshes with a tappet bushing 38 in the power unit 2. The tappet bushing 38 is a firmly connected to the slip ring shaft 8 of the power unit 2 and any rotation of the slip ring shaft 8 is therefore transmitted via the tappet bushing 38 and the drive pin 36 to a rotating part 40 of the signal unit 4. The rotating part 40 is mounted for this purpose using a one-sided bearing 42 in a static part 44 of the signal unit 4. The one-sided bearing 42 is one-sided so that it is positioned in the axial direction on only one side, specifically towards the power unit 2. This provides advantageous accessibility to the signal unit 4 via a relatively simple-to-remove cover bonnet 46.

The signal unit 4 is intended to transmit electrical signals with low power, specifically control signals and test signals. These electrical signals are transmitted inwards and outwards via cables inside the central tube 18 of the power unit 2, and via the signal connector 48 and signal mating connector 50 to the rotating part 40 of the signal unit 4. Accordingly, signal connector 48 and signal mating connector 50 are connected to a plug connection while connecting the signal unit to the power unit 2. Accordingly, the signal cables being fed into the power unit 2 inside the central tube 18 are galvanically connected to the signal connector 48. Accordingly, signal cables inside the rotating part 40 of the signal unit 4 are electrically connected or attached to the signal mating connector 50. FIGS. 2 to 4 show the construction of the slip ring transducer 1 in principle, or its components, but specific signal cables are not shown.

Cables from the signal connector 48 are electrically connected with slip rings 52 to further transmit lower power electric signals inside the signal unit 4. Brushes 54 then rub on slip rings 52 in the signal unit 4, as shown in different ways in FIG. 4.

To firmly connect the signal unit 4 to the power unit 2, i.e., in the area of signal connector area 20 and the corresponding signal connector area 34, the signal unit 4 has a corresponding connector flange 56. A sealing ring 58 is also used in the area of the connector flange 56 to seal the power unit 2 in a sealing area 60. It should be noted that the scales of the power unit 2 in FIG. 3 and the signal unit 4 in FIG. 4 are different.

Finally, a data cable 62 with a data connector plug 64 on the static part 44 of the signal unit 4 is used to transmit or conduct the low powered signals being transmitted in the signal unit 4.

Figure 5:
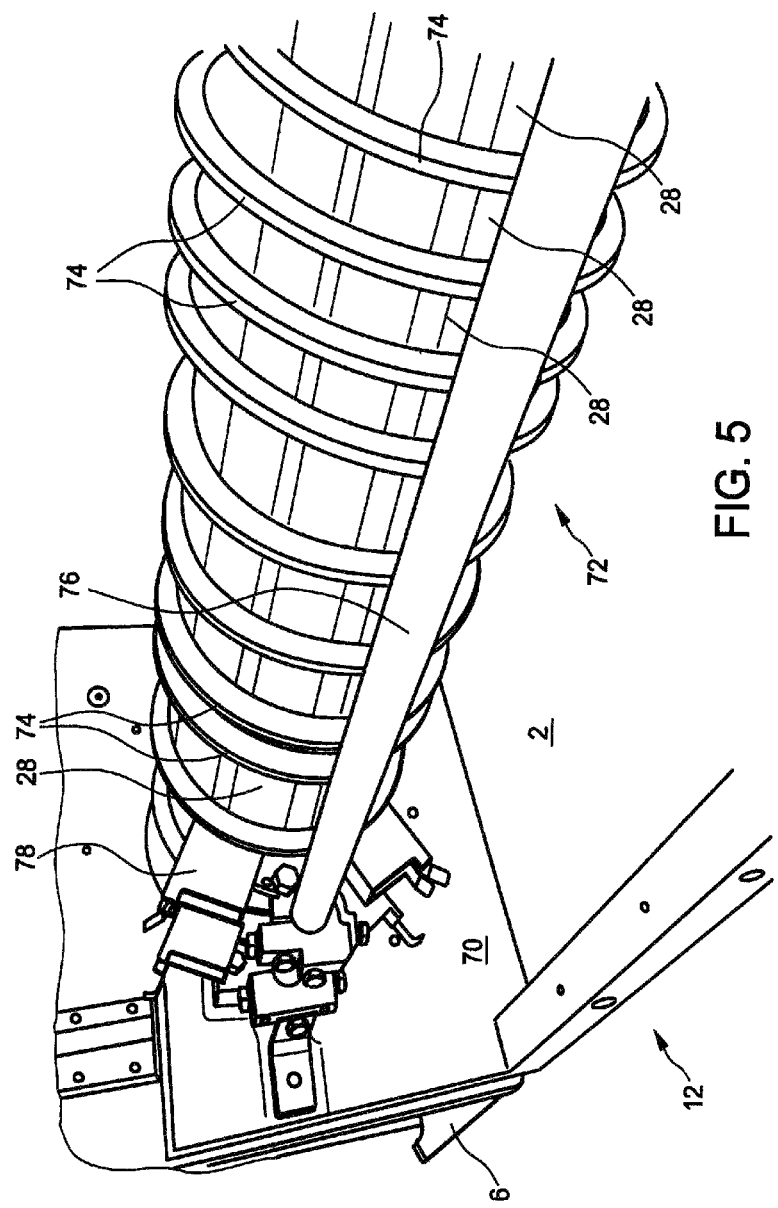
FIG. 5 shows a perspective view of a section of a slip ring assembly, mounted on a part of a slip ring transducer which is still being assembled.

The section of a partially completed power unit 2 in FIG. 5, and therefore of a partially completed slip ring transducer, shows an open housing 70 on the power unit 2. The partially open housing 70 is therefore part of the static power unit 12. In addition, a slip ring assembly 72 is partially shown surrounding a few slip rings 28, which are electrically insulated from one another in the axial direction by insulator disc sections. The insulator disc sections 74 are each part of a marginal insulating body that will be described in detail later.

A radially constructed bracket 76 for brush seating 78 is used to remove or transmit electrical energy between the slip rings and the static power unit 12 of the power unit. The brush seating 78 is attached to the radial bracket 76 using a fixture 80. Carbon brushes can be inserted into the brush seating 78 to rub the respective slip ring 28 and thereby create an electrical connection between the static power unit 12 and the rotating slip ring assembly 72. In FIG. 5, only some brush seating 78 is shown and no carbon brushes are illustrated; there is also no electrical connection, which would be made anyway with the respective brushes. For this reason, the power unit 2 and therefore the slip ring transducer 1 in total is not completely finished. However, the basic, in particular mechanical, construction can already be seen here.

Otherwise, FIG. 5 also shows a small section of the static connector 6, which is connected overall in a torsionally rigid manner to the slip ring shaft and therefore to the slip ring assembly 72.

Figure 6:
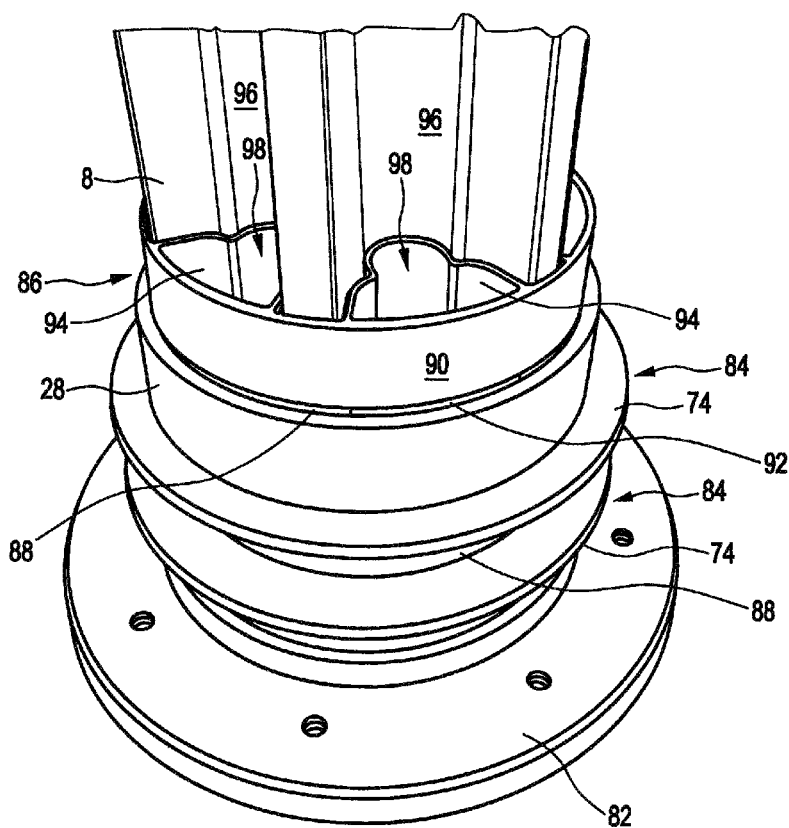
FIG. 6 shows a perspective view, for illustrative purposes, of a section of an unmounted slip ring shaft with some insulating bodies and a slip ring.

FIG. 5 also shows that the slip rings 28 of the slip ring assembly 72 vary in length in the axial direction, and there are therefore different distances between the insulator disc sections 74. FIG. 6 illustrates the construction of such a slip ring assembly 72.

FIG. 6 shows a perspective illustration of the section of a slip ring shaft 8, which is dismounted here and is resting on its shaft flange 82. Two marginal insulating bodies 84 and a spacer insulating body are moved on the slip ring shaft 8. Each marginal insulating body 84 has one insulator disc section 74 and one insulator jacket section 88. The spacer insulating body 86 does not have an insulator disc section but only has a jacket 90.

To illustrate the required elements in a slip ring assembly 72, a slip ring 28 is also moved and sits on the insulator jacket section 88 of a marginal insulating body 84. The slip ring 28 therefore covers a jacket opening 92 in the insulator jacket section 88 of the marginal insulating body 84.

Illustrative FIG. 6 also shows several cable duct sections 94 for the spacer insulating body 86, which are all fed into a guide channel 96 in the slip ring shaft 8. The two inserted marginal insulating bodies 84 also have cable duct sections, so that in each case, there is a cable duct 98 inside the marginal insulating bodies 84 and spacer insulating bodies 86 which are inserted into one another. From this cable duct 98, an appropriate electrical cable can be electrically connected through the jacket opening 92 to the slip ring 28 shown.

Again, please note that FIG. 6 is only intended for illustrative purposes. In fact, at least pursuant to one preferred embodiment, each slip ring will be used with an axial dimension, which would be fully laid out between two insulator disc sections. Accordingly, if a short slip ring 28, i.e., a slip ring that is short in its axial direction, were being used, no spacer insulating body 86 would be moved, but a marginal insulating body 84 would again be used to insulate the slip ring 28 in the axial direction.

Figure 7:
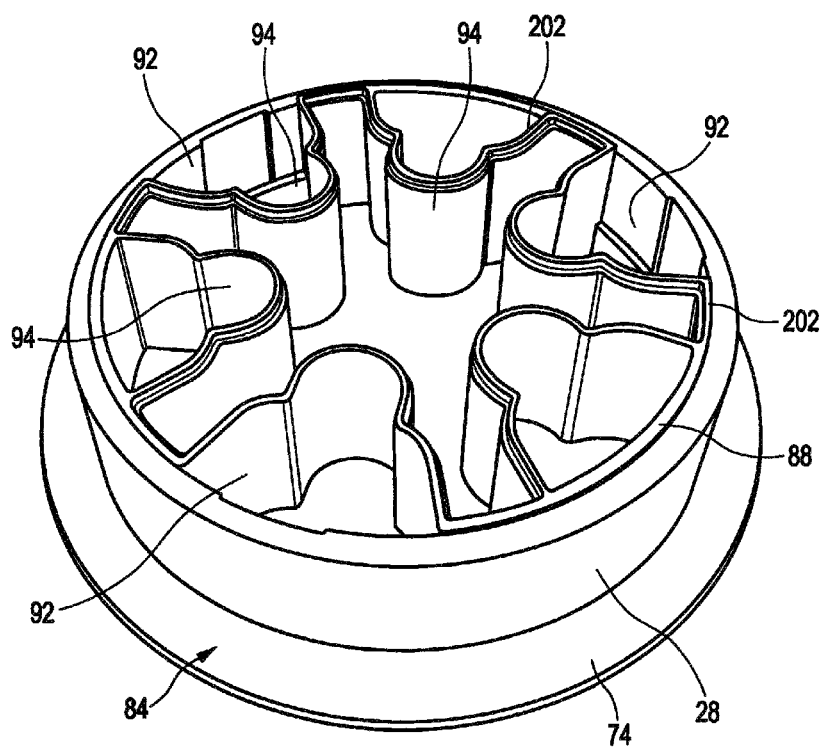
FIG. 7 shows a perspective illustration of an insulating body with a slip ring.

FIG. 7 is intended to clarify the interaction between the slip ring and the insulating body. It shows a marginal insulating body 84 with a moved slip ring 28. The marginal insulating body 84 has an insulator disc section 74 to electrically insulate the slip ring 28 in an axial direction or on its axial side. For insulation purposes and also to position it in a radial direction, the marginal insulating body 84 has an insulator jacket section 88. The insulator jacket section 88 is basically a full-length cylinder jacket, which however has three jacket openings 92 in the example shown. These jacket openings 92 are open to one side in the axial direction, i.e., pursuant to FIG. 7 above, and are closed to the other axial side. This means that the insulator jacket section therefore has a full-length cylinder jacket section, which is directly connected to the insulator disc section 74. Here, the marginal insulating body 84 is made in one piece, and may for example be made of epoxy resin, thermoplastic and/or be injection molded.

The marginal insulating body 84 also has six cable duct sections 94. The cable duct sections 94 are used to insert or to axially slide along a slip ring shaft 8 in corresponding guide channels 96, as for example is partially shown in FIG. 6. On their axial side, i.e., pursuant to FIG. 7 above, the cable duct sections 94 also have a circumferential step 202, which is fed between the two cable duct sections 94 on the insulator jacket section 88. This provides an overall circumferential step 202. On the other axial side of the marginal insulating body 84, a corresponding, reciprocal circumferential step is used. This is designed so that the several insulating bodies arranged axially next to one another on the slip ring shaft, whether these are marginal insulating bodies 84 or spacer insulating bodies 86, each have a circumferential step 202 on one side, and on the other side have a reciprocal circumferential step 202. This means that adjacent insulating bodies can be placed next to one another axially and also into one another in the area of the circumferential step 202.

The cable duct sections 94 of several insulating bodies therefore each connect to an insulator duct, through which at least one electrical cable can be fed. Depending on which insulator duct it is fed through, such an electrical cable can be electrically connected at the corresponding jacket opening 92 to the slip ring 28.

Figure 8:
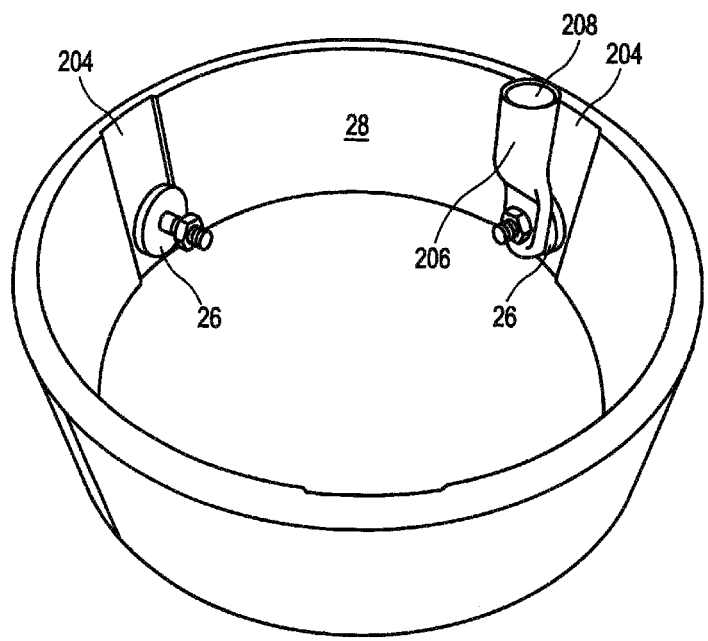
FIG. 8 shows a perspective view, in section, of a slip ring with two threaded weld studs and an attached cable shoe for illustrative purposes.

FIG. 8 only shows part of one slip ring 28 in a perspective view. On the inside of the slip ring 28, two threaded weld studs 26 are fitted, i.e., welded. Each threaded weld stud 26 is positioned in a flat axial groove 204. These axial grooves 204 can be made during the manufacture of the slip ring 28, in particular during extrusion. These flat axial grooves 204 provide a flat area onto which the threaded weld studs 26 can be firmly and securely welded. Welding can be done using arc welding or soldering, for example.

A cable shoe 206 is used to electrically connect with an electrical cable. This cable shoe takes a corresponding cable and can be firmly and galvanically electrically connected with good conductivity to a loop on the threaded weld stud 26. To illustrate this, FIG. 8 shows the cable shoe 208, but this illustration shows no cabling. This type of cabling can be fed into the opening 208 of the cable shoe 206, and may be attached for example by crimping.

Figure 9:
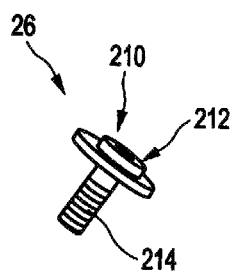
FIG. 9 shows an unmounted threaded weld stud.

A threaded weld stud 26 is shown in FIG. 9. This shows that the threaded weld stud 26 basically has a welding section 210 with a flat contact surface 212. The threaded section 214 is used to attach a cable, specifically via the cable shoe.

Figure 10:
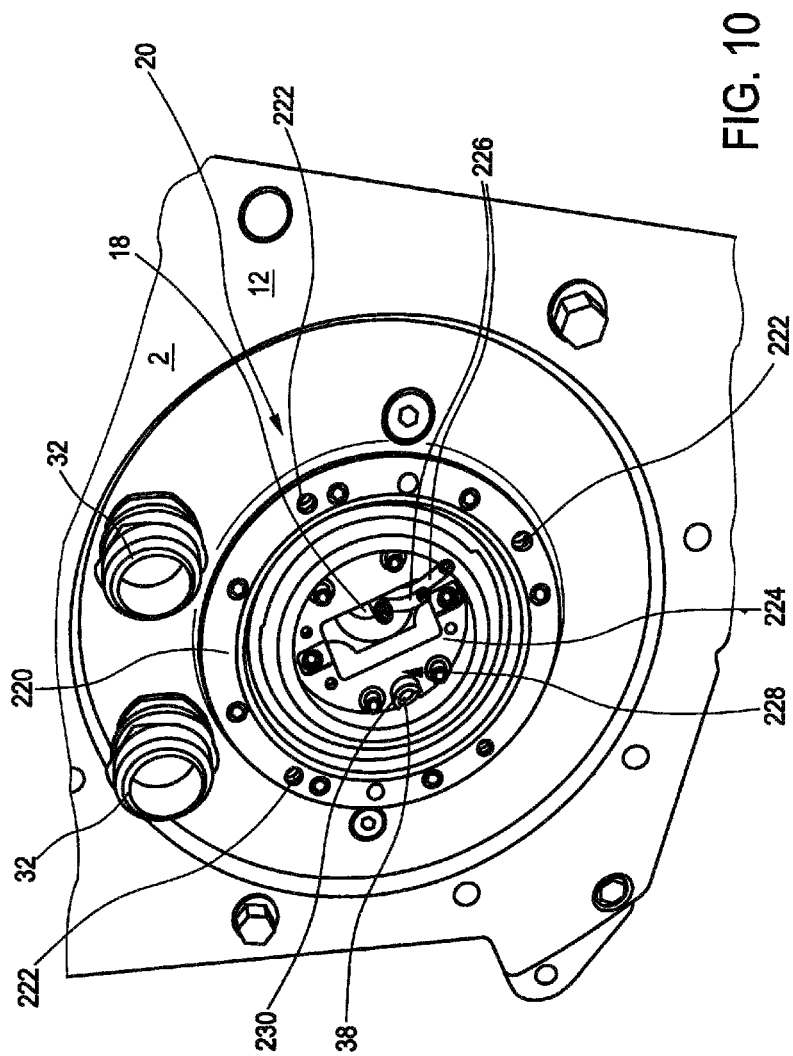
FIG. 10 shows a perspective view in a section of the front side of a slip ring transducer power unit.

FIG. 10 shows a perspective view of the front side of a power unit 2. It basically illustrates the signal unit connection area 20 of the power unit 2. There is a circumferential fixing ring 220 so that the power unit and connector flange 56 shown in FIG. 4 can be attached and firmly screwed to it. The fixing ring 220 also has a few thread holes 222. The fixing ring 220 therefore forms part of the static power unit 12.

Inside the fixing ring 220, there is therefore a shaft section 224, which is firmly connected to the slip ring shaft 8 and is therefore mounted in such a way that it can rotate relative to the fixing ring 220. Contrary to FIG. 3, a few signal cable ends 226 can be seen in FIG. 10, which are partially protruding from the central tube 18 visible in FIG. 10. Contrary to FIG. 3 however, in FIG. 10 the signal connector 48 cannot be seen yet, but which is allowed for and remains to be functionally connected with the signal cables 226.

If a signal unit 4, as shown in FIG. 4, is attached to the power unit 2, as shown in FIG. 10, and is firmly attached via its connector flange 56 to the fixing ring 220, this is done by slightly feeding the drive pin 36 into the tappet bushing shown in FIG. 10. The tappet bushing 38 is therefore designed so that the shaft section 224 has a drive hole 228, into which a coupling sleeve 230 is inserted, as shown in FIG. 10, in order to take the drive pin 36. Using the coupling sleeve 230 allows a certain elasticity and the coupling sleeve 230 can also be designed to lead the drive pin 36 to be slightly inserted when assembling the signal unit 4 and the power unit 2.

As can also be seen in the overall view in FIG. 2, the signal unit 4 is significantly smaller than the power unit 2. Basically, the signal unit 4 barely extends beyond the external diameter of the fixing ring 220 in a radial direction. The static connector elements 32 shown in FIG. 10, which are used to connect cables carrying high power from the power unit therefore lie outside the signal unit 4.

Figure 11:
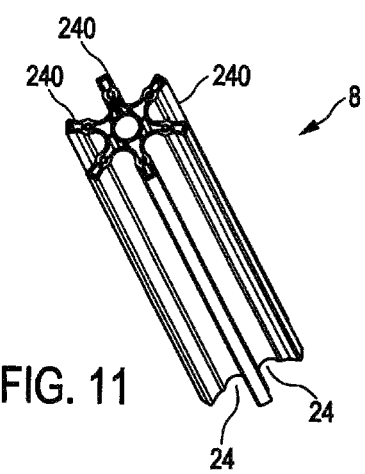
FIGS. 11 and 12 show 2 different perspectives of a slip ring shaft.
Figure 12:
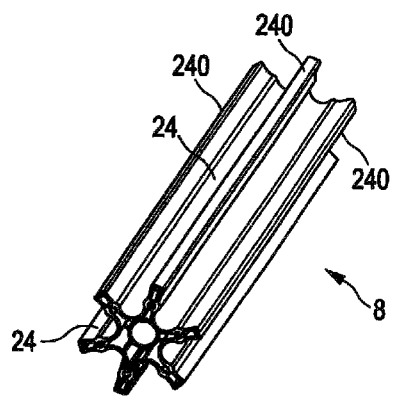

FIGS. 11 and 12 show two different perspective views of a slip ring shaft 8. This slip ring shaft 8 is basically radial in design and has six identical and symmetrical arms 240 set at 60° to one another. Between each pair of adjacent arms 240, guide channels 24 are arranged to each take a cable duct section 94 of a marginal insulating body 84 or a spacer insulating body 86, as shown for example in FIG. 6. Electrical cables, in particular for carrying high-power electric current or high-power current strength, can be fed into these, in the axial direction around the circumference of the slip ring shaft 8. This slip ring shaft 8 can be manufactured using extrusion. The slip ring shaft 8 accordingly has an axially constant, i.e., radial, cross-section.

Figure 13:
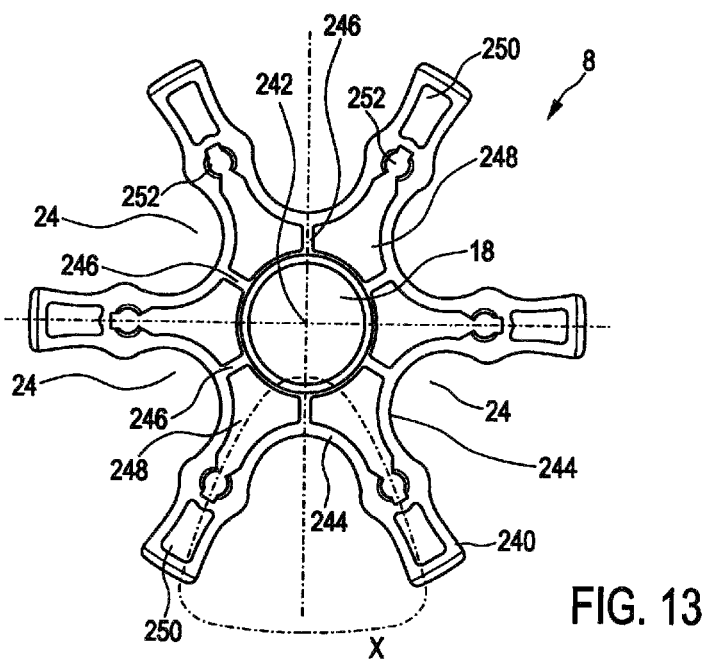
FIG. 13 shows a top view of a slip ring shaft in the axial direction.

Individual sections of the slip ring shaft 8 can be illustrated in the axial top view in FIG. 13. According to this, the slip ring shaft 8 has a central tube 18, through which a central axis 242 of the slip ring shaft 8 runs. The six arms 240 are identical in size and are arranged concentrically around the central axis 242 and therefore also concentrically around the central tube 18. The arms 240 are connected to one another via connector sections 244, which here in the axial top view are roughly arranged in an arc. This somewhat arc-shaped arrangement of connector sections 244 forms a guide channel 24 or a part of one. In addition, the connector sections 244 are connected via connector bridges 246 to the central tube 18, and above it, there is also a connection between the central tube 18 and the arms 240. Overall, this provides a stable but light structure. Low weight is also achieved in part by the base cavities 248 and the arm cavities 250. The base cavities 248 are provided here between a base area of each arm 240, two connector bridges 246 and one part of the central tube 18. The arm cavities 250 are each positioned in a radial area beyond the arm 240.

Each arm 240 also has axial thread holes 252, which can be used to attach other elements on both of their front sides via the slip ring shaft 8. This specifically allows a fixed and torsionally rigid connection to be made with or to the rotating connector 6. And this allows a fixed and torsionally rigid connection to be made to the shaft section 224 shown in FIG. 10.

Figure 14:
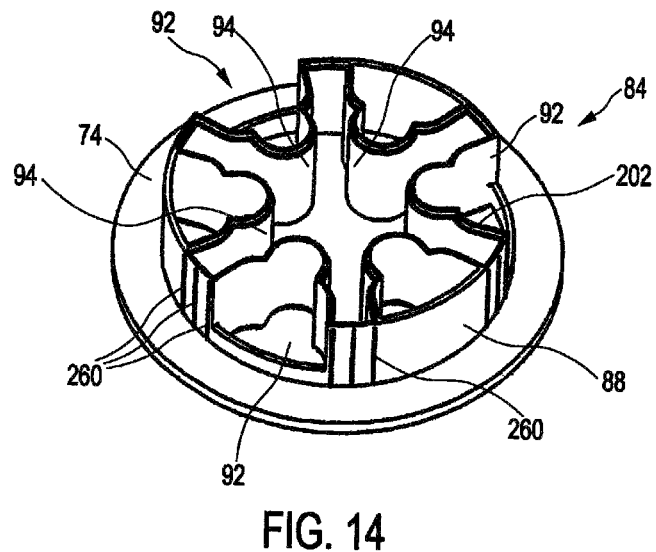
FIGS. 14 and 15 show a schematic view from different perspectives of a marginal insulating body.
Figure 15:
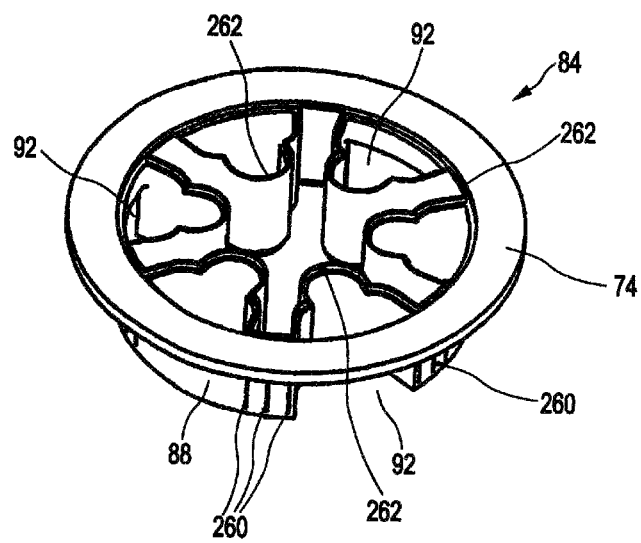

The marginal insulating body 84 is shown in two different views in FIGS. 14 and 15. It has a roughly cylinder-jacket-shaped insulated jacket section 88, which is partially interrupted by three jacket openings 92. The fully-surrounding insulator disc section 74 is intended to insulate any axially adjacent slip rings, is roughly disc shaped and has a larger external diameter than the insulated jacket section 88. As intended, a slip ring is axially pushed on the insulator jacket section 88 and then bumps up against the insulator disc section 74. To achieve a firm seat on the insulator jacket section 88 for a moved slip ring, jacket ridges 260 are used on the insulator jacket section 88. These jacket ridges are designed to be very flat, oblong ridges arranged in the axial direction and are distributed over the circumference of the insulator jacket section 88. These jacket ridges 260 are manufactured in one piece with the remaining marginal insulating body 84 from one material, and for example may already be included in an injection mold for manufacturing the marginal insulating body 84. The jacket ridges are specifically less than 1 mm high.

The cable duct sections 94 are used to carry electrical cables and to enable the most precise placing and sliding onto a slip ring shaft possible.

FIG. 14 shows a circumferential step 202, which is used on the cable duct sections 94 and partly on the insulator jacket section 88. This circumferential step 202 is a circumferential ridge, arranged relative to a central point of the marginal insulating body 84 from the outside in.

Another side of the marginal insulating body 84 shown in FIG. 15 has a corresponding circumferential step 262. This corresponding circumferential step 262 is also basically used on one edge of the cable duct sections 94 and partly on the insulator jacket section 88, specifically in the transition area between the insulator jacket section 88 and the insulator disc section 74. In this way, the corresponding step 262 is a ridge, which points to the central point of the marginal insulating body 84. In this way, the circumferential step 202 is adapted to the corresponding circumferential step 262 and these can be put together.

Figure 16:
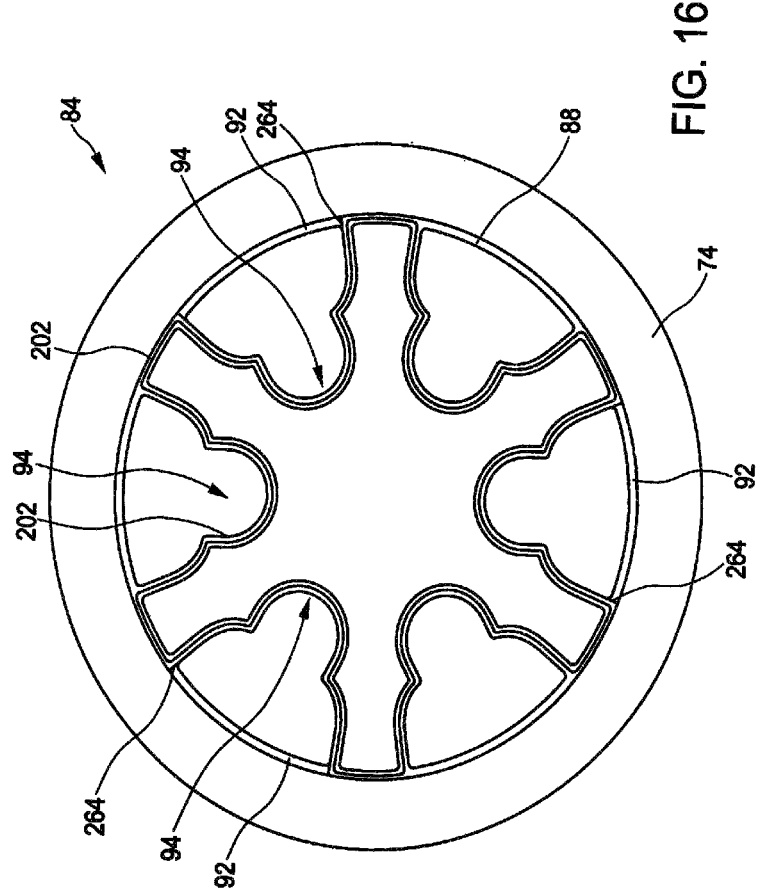
FIG. 16 shows a top view of a marginal insulating body in the axial direction.

FIG. 16 basically shows a top view onto the marginal insulating body 84 in accordance with FIG. 14, i.e., a top view onto the circumferential step 202. Otherwise, FIG. 16 shows the insulator disc section 74 and the insulated jacket section 88. The circumferential step 202 runs along one edge of the cable duct sections 94 and partly on one edge of the insulated jacket section 88. Opening edges 264 indicate the three jacket openings 92.

Figures 17, 18:
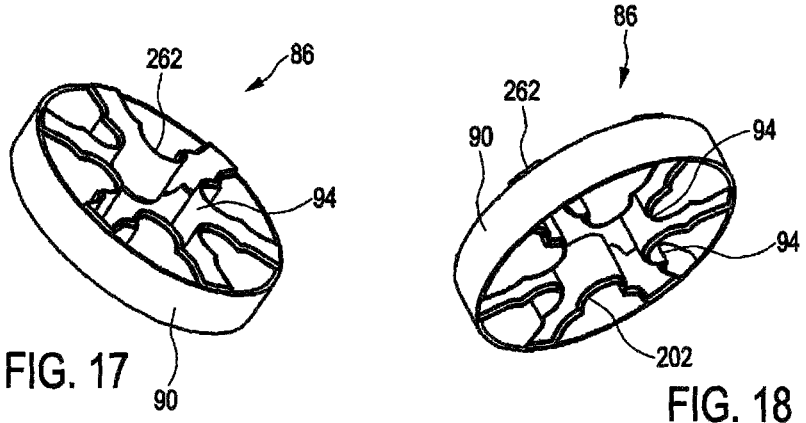
FIGS. 17 and 18 show a schematic view from different perspectives of a spacer insulating body.
Figure 19:
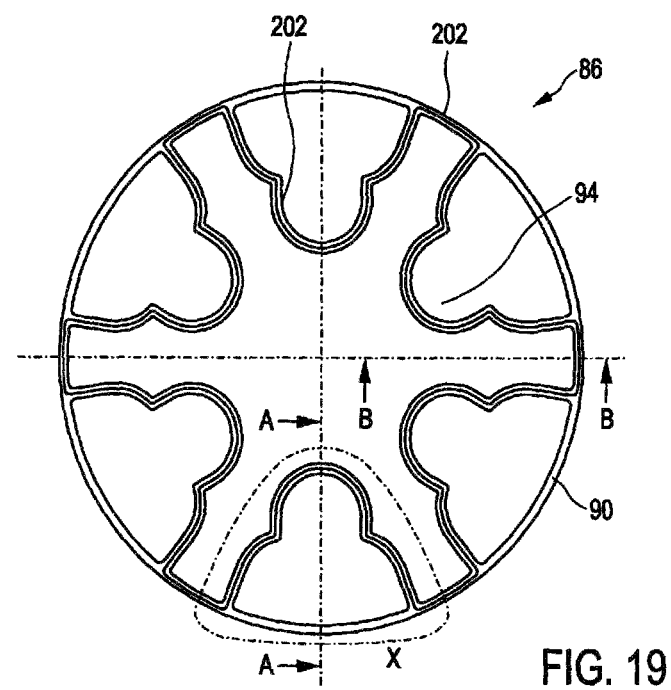
FIG. 19 shows a top view of a spacer insulating body in the axial direction.

FIGS. 17 and 18 show a spacer insulating body 86 in a perspective view, which is shown in an axial view in FIG. 19. The spacer insulating body 86 is basically the same as the marginal insulating body 84, which is shown in FIGS. 14 to 16 and was illustrated such that neither the spacer insulating body 86 nor an insulator disc section yet has a jacket opening. The spacer insulating body 86 in this embodiment is intended to work in combination with a marginal insulating body 84, specifically if a slip ring is expected to be moved on the insulated jacket section 88 of the marginal insulating body 84, which has a larger axial dimension than the axial dimension of the insulated jacket section 88. In this case, at least one spacer insulating body 86 is attached to the marginal insulating body 84, specifically so that the spacer insulating body 86 is meshed via its corresponding circumferential step 262 with the marginal insulating body 84 in the area of its circumferential step 202. The insulated jacket section 88 therefore extends around the jacket section 90 of the spacer insulating body. If the axial length is not sufficient here, an additional spacer insulating body 86 can be attached to the spacer insulating body 86 already being used. To do this, the circumferential step 202 of one spacer insulating body 86 is attached to the corresponding circumferential step 262 of the other newly attached spacer insulating body 86.

Using the jacket opening 92 of the marginal insulating body 84 is sufficient to electrically connect a cable. The spacer insulating body 86 therefore has no opening in its jacket 90. Furthermore, the marginal insulating body 84 is also highly stable due to its insulator disc section 74, which supports the provision of jacket openings 92, whereby it counteracts a slight loss of stability due to these jacket openings 92.

Although the spacer insulating body 86 is described as different from the marginal insulating body 84, it still has some of the same elements or sections, specifically the circumferential step 202 and the corresponding circumferential step 262, as well as the cable duct sections 94.

Figure 20:
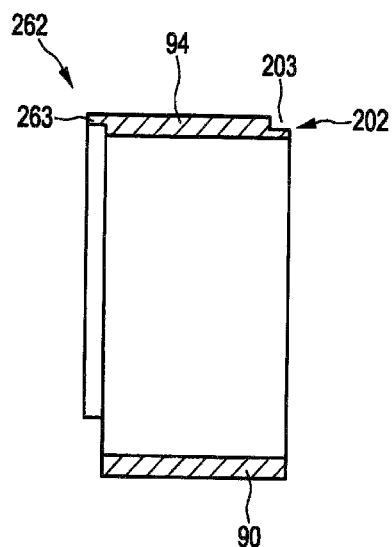
FIG. 20 shows a section view of a spacer insulating body from a detail in FIG. 19.

FIG. 19 also shows a section X, illustrated by a section A-A in FIG. 20. The sectional view shows a section through the jacket 90 and the cable duct section 94. The sectional view, specifically of the cable duct section 94, clarifies the layout of the circumferential step 202 and the corresponding circumferential step 262. Measured in the axial dimension of the jacket 90, the circumferential step 202 is therefore formed by a step-shaped indentation 203 and the corresponding circumferential step 262 is formed by a step-shaped ridge 263. If two insulating bodies are now put together here, the step-shaped ridge 263 will be inserted into the step-shaped indentation 203.

Figure 21:
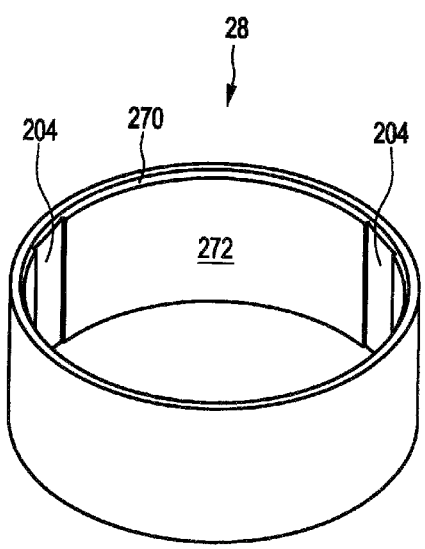
FIG. 21 shows a slip ring in a perspective illustration.

The slip ring 28 in FIG. 21 corresponds to the one shown in FIG. 8, whereas no threaded weld studs have been attached so far. Moreover, the technical manufacturing details may differ, as for example with the circumferential phasing 270 in FIG. 21. To put a slip ring transducer together, specifically a slip ring assembly, the slip ring 28 has an internal jacket surface 272, intended for attaching to an insulator jacket section 88 and/or a jacket section 90 of a marginal insulating body 84 or a spacer insulating body 86. Alternatively, the internal jacket surface 272 is positioned on the jacket ridges 260, if a marginal insulating body is used pursuant to FIG. 14 and FIG. 15.

Depending on the size of the current being transmitted, and therefore the power being transmitted, the slip ring 28 may have different axial dimensions, i.e., may be different in height pursuant to FIG. 21. Otherwise, the construction of the slip ring 28 does not change. This means the slip ring 28 can be manufactured using extrusion and can be shortened to the desired length.

Figure 22:
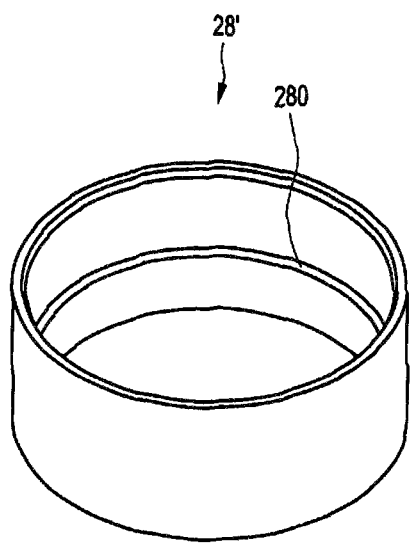
FIG. 22 shows a slip ring for transferring a ground potential in a perspective view.

FIG. 22 shows a specific slip ring 28' to connect an electrical earth from the rotating to the static part of the slip ring transducer, and therefore from the static to the rotating part of the corresponding application or vice versa. This slip ring 28' has an internal circumferential step 280, and therefore different thicknesses in its jacket area. The slip ring 28', which can also be referred to as the earth slip ring 28', is required to conduct away compensating current which may be created by potentials in the spinner, in order to avoid this flowing across a bearing and damaging it.

Figure 23:
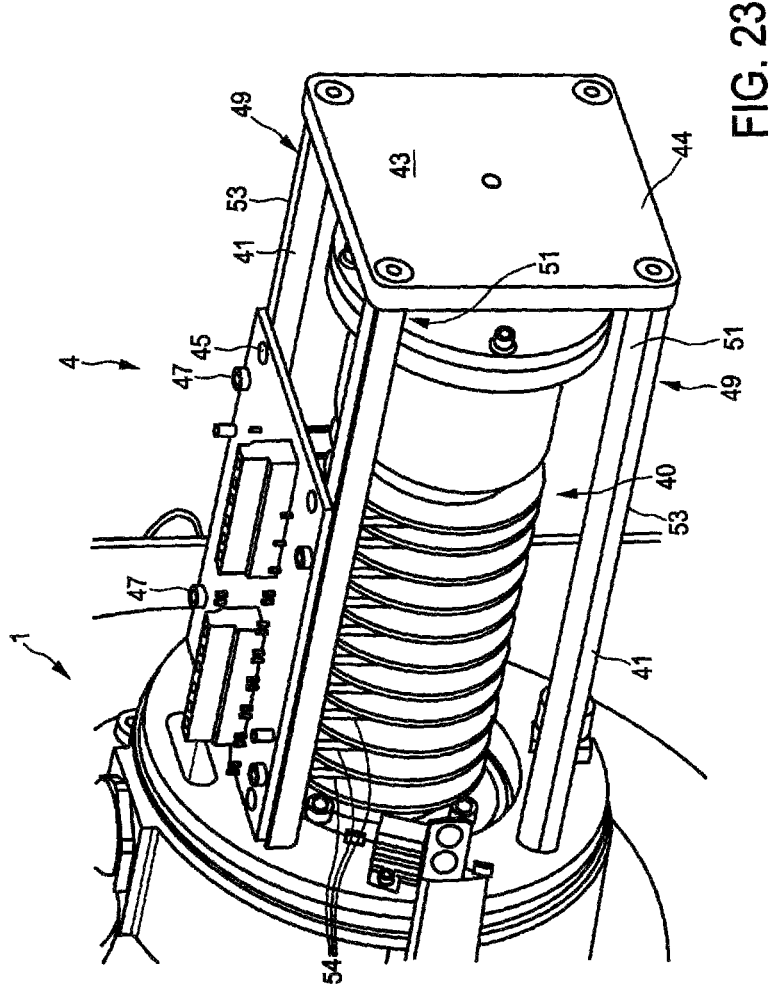
FIG. 23 shows a signal unit of a slip ring transducer without a cover bonnet in a perspective illustration.

FIG. 23 shows a section of a slip ring transducer 1, specifically the signal unit 4 of the slip ring transducer 1. The signal unit 4—contrary to the illustration in FIG. 4—is mounted here on the slip ring transducer 1, but is open, i.e., without any cover bonnet. It can also be seen in FIG. 23 in the perspective view of the rotating part 40 and the static part 44. The static part 44 has four retaining braces 41 to create a stable base structure for the static part 44. Above these retaining braces 41, which can also be referred to as signal unit braces 41, an end plate 43 is attached to the remaining part of the slip ring transducer 1. The rotating part 40 rotates inside these four signal unit braces 41.

Two of these signal unit braces 41, i.e., those illustrated in FIG. 23 above, take a signal unit board 45 which holds the electronics or connector elements and the brushes 54. The signal unit board 45 is screwed onto these two upper signal unit braces 41 from above, using signal unit screws 47. The signal unit board 45 therefore have a mounting surface 49. The signal unit braces 41 are therefore roughly U-shaped in cross-section, whereby the "U" is closed. The signal unit braces 41 therefore have a flat surface in one direction, which is bordered by two edges 43, and on the side adjacent to this surface these signal unit braces each have an arch 51. The arch 51 is therefore basically oriented towards the rotating part 40. In any case, none of the edges 53 are oriented towards the rotating part 40. This creates a useful way of mounting above this surface, and likewise any edges where there is the greatest risk of electrical flashover are not oriented towards the rotating part 40, in order to avoid just such flashovers.

The braces of the signal unit 4 are made of extruded aluminum. This is proposed as a basic principle, not just for the embodiment shown in FIG. 23 or 4. The signal unit braces 41 are basically identical, whereby the signal unit braces 41, which are shown in FIG. 23 and are connected to the signal unit board 45, have additional holes to accept the signal unit screws 47 opposite the two signal unit braces 41. In this way, the extrusion process can be used to manufacture a brace which can be shortened to the desired length and made with the required holes.

The shape is therefore a semicircular square, so that only two edges of the square are present. This shape is expensive to produce because the semicircle requires a relatively major processing, and it would have a poor surface if processing were carried out using corresponding cutting or filing. The two edges mean it cannot be made as a turned part. The arches and the flat surfaces and edges are, however, required for the reasons stated above. Normally, no excessive increases in field strength occur, and therefore flashovers mostly occur at sharp edged places. The semicircle or arches of the semicircle point towards the current-conducting slip rings of the rotating part 40 and here there may be a potential between the slip ring and these earthed signal unit braces 41. Using extrusion for manufacturing makes it possible to manufacture this beneficial shape of this signal unit brace, i.e., cross-section shape.

Moreover, manufacturing using extrusion allows flexibility in the length of the signal unit braces 41. To extend the signal unit 4, the length of the signal unit braces can simply be varied, and therefore larger slip ring transducers with more rings in the signal unit can be made.

Moreover, extrusion gives a good surface. In particular, grit does not stick to the surface and the braces are easier to maintain and clean.

Moreover, during the extrusion process, i.e., during aluminum extrusion as we are suggesting here, it is possible to anodize the workpiece in the factory, i.e., to oxidize the surface in an electrobath and therefore create a thicker oxide coating. The aluminum oxide coating has the useful property of being electrically insulating. Thicknesses of up to 100 μm may be possible here. A thickness of approximately 20 μm is preferably proposed. This is beneficial because a thickness of 15 μm should already have a breakdown voltage of 500-600 V and therefore a thickness of 20 μm has good, sufficient installation for this signal unit 4. The raw braces, i.e., the signal unit braces prior to oxidization, can be several meters long and can be oxidized at that length. This means the oxidization process can be carried out with little or insignificant additional expense.

Therefore, an improved, at least altered slip ring transducer is being proposed, with a roughly radial shaft. This is particularly well-suited as an extrusion shape, and is therefore scalable and allows modular construction and therefore reusability. The type of shaft creates guide channels, like the guide channels 96 for example, and can therefore optimize cabling. The specific bundling or unbundling of cables can also improve heat dispersal. Likewise, electromagnetic compatibility is improved, which is why we are proposing to put signal units inside the central tube of the shaft, i.e., separated from the cabling.

The proposed insulating bodies allow modular construction and scalability. In particular, using different numbers of spacer insulating bodies, including none, allows modular construction, and the insulating bodies essentially only need to be fitted to the shaft. Corresponding circumferential steps improve the insulation between insulating bodies, which will also reduce or prevent creepage paths for currents, since the insulating bodies can fully inter-mesh. Small ridges on the insulating bodies, or at least on a few insulating bodies, may allow the slip rings to be accommodated without play, and therefore improve run out, which can also extend the lifespan.

Slip rings are preferably mounted as semi-finished products above sleeve-bearing bronze bushings, whereby some connectors for connecting electrical cables may be able to be pressed on. Fundamentally different connection techniques can be used. Using sleeve-bearing bushings as semi-finished products gives the slip rings greater stability, which is also supported by manufacturing with strain hardening. This can result in greater resistance to wear and good electrical properties being obtained.

To connect electrical cables, specifically for large cross-sections like 35 mm², 50 mm² and 70 mm², different variants are proposed.

One variant is to solder a connector. Here, a connector can be soldered to the slip ring and this piece can be fed into a guide such as a dovetail groove and soldered onto a specified position. A cable is fed into this connector in turn and is fixed, soldered, for example.

Another or an additional variant is to press on a connector. Here, for example, one of the connectors described in the previous variant can be pressed onto an extruded slip ring during manufacturing. This would avoid any soldering.

Yet another variant involves using a sleeve-bearing bushing with flat contact surfaces. A threaded weld stud can be fitted to these flat contact surfaces using arc welding. The respective cabling can now be easily laid on these threaded weld studs using cable shoes.

An interface between the signal unit and the power unit is also proposed, which is equipped with a mechanical drive device. This is configured so that a clamping pin, introduced or provided for in the signal unit, is inserted into a bushing in the power unit. A clamping pin allows a play-free drive. The bushing is designed as a wearing part and can easily be replaced, namely through one of the corresponding holes in the sleeve.

We also propose closing the power unit housing using quick release fasteners or quick action fasteners to allow quick maintenance. This type of quick action fastener may also include a spacer bracket for sealing.

We likewise propose the use of pre-stressed bearings, which offer a defined bearing load and a greater lifespan, and also ensure play-free mounting.

In this case, a predefined voltage is applied to the bearing, in particular a roller bearing, by a disc spring in order to force the corresponding rolling element back into a predefined configuration, namely an "O configuration". This causes high bearing rigidity, which is characterized by limited tilting and/or high torque resistance. This high bearing rigidity is particularly important for the signal slip ring, i.e., the slip ring of the signal unit, and the sensors installed in it.

A one-sided bearing for the signal unit is also proposed. Here, the housing can be designed to be completely removed, which allows for thorough and simple maintenance. Pre-stressed bearings can also be used here for a defined bearing load, thereby providing greater lifespan and play-free mounting.

Using individual slip rings with set axial dimensions is also proposed, which can be described as length or width, depending on the point of view. These dimensions may be one of three variants, i.e., three set axial dimensions, e.g., 29 mm, 54 mm and 79 mm. These will be arranged according to defined current load capacities, therefore 150 A, 300 A or 450 A in the example given.

Using a bronze slide bearing semi-finished product for the slip ring material is also proposed. Thus another well-known material from other areas can be used. Stability can accordingly be increased here, with acceptable electrical properties.

Two different insulating bodies are also proposed, namely a marginal insulating body and a spacer insulating body as specified above. The marginal insulating body will be used to separate slip rings of different potentials and a spacer insulating body, which can be attached in many ways, to take different widths of slip rings. For this purpose, insulated cable channels will be provided along the shaft, specifically using the cable duct sections 94 described.

For this purpose, a profiled shaft like the one in the insulating body is proposed, which is extruded in particular.

Preferably, cables are connected to the slip ring via threaded weld studs attached by arc welding.

This therefore allows a modular power unit, made up of different numbers of slip rings and insulating bodies.

Likewise, it is proposed to use coupling to separate the signal unit from the power unit.

This specifically creates a modular system, in which a power slip ring transducer and a signal slip ring transducer are separated by electrical and mechanical coupling, and form two individual slip ring transducers. It is also possible to attach multiple internal connectors to the slip ring in order to transfer differently sized currents. For this purpose, the corresponding cables can be supplied to the slip ring by multiple guide channels or cable ducts, and the corresponding insulating body, specifically the marginal insulating body, has multiple openings for this purpose, specifically jacket openings.

Various internal cables, which specifically may have different cross-sections or be different in number, may be fitted using a single connector on each ring.

A slip ring is preferably made of extruded bronze semi-finished product, known as slide bearing bronze, and can be shortened to a suitable ring width, or suitable axial dimension.

An extruded aluminum shaft for the slip ring shaft is preferably proposed, which can be shortened to meet requirements.

We also propose a single carbon brush holder, at least for the power unit, which has a specified width, so that an appropriate slip ring can be used for the required output, i.e., which is suitably adapted to the required output of the carbon brush holder on the corresponding slip ring.

Using carbon brush holders with pockets to hold a longer carbon brush, when using a self-recoiling spring to guarantee the best possible pressing force throughout the entire life of the system, can increase the lifespan. Increasing the lifespan may also be achieved by using pre-stressed bearings, to guarantee the best possible rolling ratio in the bearing. Roller bearings with more grease filling are preferably used to ensure longer lasting lubrication. We also propose using a lubricant with a greater temperature range, so that extreme temperatures do not cause the lubricant to fail.

Avoiding heating the bearing points of the slip ring transducer is also proposed, specifically of the power unit and/or the signal unit at the lowest temperatures. This measure is specifically beneficial when using a wind turbine installed in cold regions or at least in regions where it is cold in winter.

Using a slip ring made of cold-worked, wrought sleeve-bearing bushing material also helps to increase the lifespan because it has higher wear resistance.

Improved heat distribution and therefore avoiding excessively high temperatures is achieved by laying cables inside the extruded aluminum shaft. In this way, there is no dense bundling, because cables from the power unit are fed into individual guide channels in the shaft, specifically the extruded aluminum shaft, and therefore run individually or in combination with a few other cables in such a guide channel. The signal cables run together in a central tube and are therefore separated from the power cables of the power unit. It may still be worth considering bundling the signal cables in the central tube, but this would weaken the separation of power cables. Little heat generation is to be expected in the signal cable either.

The proposed sequence of insulating bodies, and thereby complete meshing, results in greater creepage paths and therefore improved insulation due to the circumferential steps and corresponding circumferential steps.

The proposed variant, i.e., using arc welding to solder a threaded weld stud, means that it is possible to transfer only minimal heat into the slip ring. The input of too much heat and therefore warming, which may locally soften the corresponding cold work area, should be avoided.

Pursuant to one proposal, the insulating body has small ridges, specifically the jacket ridges 260 described, which can deform when the slip ring concerned is moved, so that the slip ring can be held without play.

Quick release fasteners or quick action fasteners allow for better maintenance by offering quick, easy-to-open access to the corresponding area of the slip ring transducer without the need for tools. The signal unit is preferably mounted on one side, in order to allow access to the housing from all the way round, or to enable housing to be removed completely. This allows maintenance-friendly construction.

A drive between the signal unit and power unit, through which the power unit transmits its rotating movement to this signal unit, is preferably designed using a replaceable bushing, specifically a sleeve inserted into a hole. If there is any wear here, the bushing or sleeve are easily replaced.

The invention claimed is:

1. A slip ring assembly of a slip ring transducer for transmitting electrical signals between a static part and a rotating part, the slip ring assembly comprising:
   at least one slip ring coupled to the rotating part for transmitting one of the electrical signals between the at least one slip ring and at least one rubbing element coupled to the static part;
   a slip ring shaft fixed to the at least one slip ring, wherein the slip ring shaft comprises guide channels around its circumference configured to receive electrical cables and electrically couple the cables to the at least one slip ring; and
   at least one insulating body around the slip ring shaft, wherein the slip ring shaft has a profile and the insulating body has a counter profile so that the insulating body, along with the counter profile, is configured to be moved in an axial direction along a profile of the slip ring shaft, wherein the profile and the counter profile mesh in such a way to provide a torque-proof connection.

2. The slip ring assembly according to claim 1, wherein the at least one rubbing element is a brush.

3. The slip ring assembly according to claim 1, wherein the slip ring shaft has an inner circumference and radial supports that extend outwardly from the inner circumference, the radial supports including the guide channels.

4. The slip ring assembly according to claim 1, wherein the at least one slip ring is made from a bronze slide bearing semi-finished product.

5. The slip ring assembly according to claim 1, further comprising a threaded weld stud configured to attach an electrical connector cable from at least one slip ring, a soldered connector on the slip ring.

6. The slip ring assembly according to claim 1, comprising a plurality of slip ring sections in an axial direction, and that each slip ring section forms a galvanically connected unit, and that the slip ring sections of different axial dimensions have different slip rings of a same size, so that each axial dimension of each slip ring section is achieved by the number of slip rings used.

7. The slip ring assembly according to claim 1, wherein the slip ring shaft has a through-hole having a longitudinal axis that is co-axial with a rotational axis of the slip ring assembly.

8. The slip ring assembly according to claim 7, wherein the at least one insulating body is configured to electrically insulate at least one of:
   two adjacent slip ring assemblies from one another;
   a slip ring from the slip ring shaft; and
   at least one of the electrical cables in the guide channels.

9. The slip ring assembly according to claim 1, wherein the at least one insulating body is a plurality of insulating bodies and the at least one slip ring is a plurality of slip rings.

10. The slip ring assembly according to claim 9, wherein the plurality of insulating bodies, each having identical cross-sections and differing lengths or differing axial dimensions as each other, wherein the plurality of insulating bodies are configured to mesh together on the slip ring shaft.

11. The slip ring assembly according to claim 9, wherein the plurality of insulating bodies have stepped edges to fit with corresponding stepped edges of an adjacent insulating body of an adjacent slip ring assembly.

12. The slip ring assembly according to claim 9, wherein at least one of the plurality of insulating bodies is used as a marginal insulating body to electrically insulate the at least one slip ring in a radial direction and in an axial direction, and at least one of the insulating bodies is used as a spacer insulating body to electrically insulate at least one slip ring in a radial direction only, such that the spacer insulating body is specifically configured in an axial direction between two marginal insulating bodies.

13. The slip ring assembly according to claim 9, wherein some of the plurality of insulating bodies on the slip ring shaft are juxtaposed, and in combination form at least one axial cable duct configured to receive one of the at least one electrical cables, wherein the at least one cable duct is insulated by the insulating bodies from other slip rings and from the slip ring shaft.

14. The slip ring assembly according to claim 9, wherein at least one of the plurality of insulating bodies includes an external cylinder section and at least one ridge is located on the external cylinder section and is configured to assist in coupling the cylinder section to the slip rings.

15. The slip ring assembly according to claim 9, wherein the plurality of slip rings and the plurality of insulating bodies are replaceable, wherein the plurality of slip rings and the plurality of insulating bodies are configured to slide onto the slip ring shaft.

16. A slip ring transducer to transmit electrical signals between a static part and a rotating part that rotates around a rotation axis, the slip ring transducer comprising:
 a slip ring assembly including:
  at least one slip ring coupled to the rotating part for transmitting one of the electrical signals between the slip ring and at least one rubbing element coupled to the static part;
  a slip ring shaft fixed to the at least one slip ring, wherein the slip ring shaft comprises guide channels around its circumference configured to receive electrical cables and electrically couple the cables to the at least one slip ring; and
  an insulating body around the slip ring shaft,
  wherein the slip ring shaft has a profile and the insulating body has a counter profile so that the insulating body, along with the counter profile, is configured to be moved in an axial direction along the profile of the slip ring shaft, and the profile and the counter profile mesh in such a way to provide a torque-proof connection.

17. The slip ring transducer according to claim 16, further comprising a signal unit section and a power unit section, the signal unit section and the power unit section each have a fixed mounted section that is rotatable, and both of fixed mounted sections are removably connected by a respective coupling element such that a rotating movement in one of the rotatable mounted sections can be transmitted to the other rotatable mounted section via the coupling element.

18. The slip ring transducer according to claim 17 wherein the coupling element on the power unit is designed as a tappet bushing to hold a corresponding, partially available drive pin on the signal unit.

19. The slip ring transducer according to claim 17, wherein the power unit has a housing configured to be closed by quick release fasteners and at least one of the rotatable mounted sections is mounted using at least one pre-stressed bearing.

20. A wind turbine comprising:
 a nacelle;
 an aerodynamic rotor mounted to the nacelle such that the aerodynamic rotor is configured to rotate relative to the nacelle; and
 a slip ring transducer configured to provide electrical coupling between the nacelle and the aerodynamic rotor, the slip ring transducer including:
 a slip ring assembly including:
  a plurality of slip rings coupled to the aerodynamic rotor, each configured to transmit electrical signals between the respective slip ring and at least one brush coupled to the nacelle; and
  slip ring shafts located in the slip rings, respectively, wherein the slip ring shafts have an inner circumference and supports that extend radially from the inner circumference thereby forming guide channels configured to hold electrical cables for electrically coupling to respective slip ring; and
  an insulating body around the slip ring shaft,
  wherein the slip ring shaft has a profile and the insulating body has a counter profile so that the insulating body, along with the counter profile, is configured to be moved in an axial direction along the profile of the slip ring shaft, and the profile and the counter profile mesh in such a way to provide a torque-proof connection.

* * * * *